US010618731B2

(12) United States Patent
Ramankutty et al.

(10) Patent No.: US 10,618,731 B2
(45) Date of Patent: Apr. 14, 2020

(54) AUTOMATED LIFTING STORAGE CART

(71) Applicant: Swisslog Logistics, Inc., Newport News, VA (US)

(72) Inventors: Mohan Ramankutty, Mountain House, CA (US); Christopher Brumm, Ripon, CA (US); Rodney Tipton, Acampo, CA (US); Pat Mitchell, Stockton, CA (US)

(73) Assignee: Swisslog Logistics, Inc., Newport News, VA (US)

( * ) Notice: Subject to any disclaimer, the term of this patent is extended or adjusted under 35 U.S.C. 154(b) by 264 days.

(21) Appl. No.: 15/123,843

(22) PCT Filed: Mar. 3, 2015

(86) PCT No.: PCT/US2015/018530
§ 371 (c)(1),
(2) Date: Sep. 6, 2016

(87) PCT Pub. No.: WO2015/134529
PCT Pub. Date: Sep. 11, 2015

(65) Prior Publication Data
US 2017/0081121 A1 Mar. 23, 2017

Related U.S. Application Data

(60) Provisional application No. 61/948,311, filed on Mar. 5, 2014.

(51) Int. Cl.
*B65G 1/06* (2006.01)
*B65G 1/04* (2006.01)
(52) U.S. Cl.
CPC .......... *B65G 1/065* (2013.01); *B65G 1/0414* (2013.01); *B65G 1/0421* (2013.01); *B65G 1/0492* (2013.01)

(58) Field of Classification Search
CPC ...... B65G 1/065; B65G 1/0414; B65G 1/042; B65G 1/10; G05D 1/021
See application file for complete search history.

(56) References Cited

U.S. PATENT DOCUMENTS 1,664,499 A    4/1928  Baker
2,808,996 A   10/1957  Delfox
(Continued)

FOREIGN PATENT DOCUMENTS

DE      3923965 A1    1/1991
DE     20307005 U1    8/2003
(Continued)

OTHER PUBLICATIONS

International Search Report and Written Opinion for PCT/US2015/12366, dated Apr. 14, 2015.
(Continued)

*Primary Examiner* — Thai T Dinh
(74) *Attorney, Agent, or Firm* — Bachman & LaPointe, P.C.

(57) ABSTRACT

An apparatus for lifting a load on an automated lifting cart, including a lifting surface vertically movable relative to the lifting cart, two pairs of cams positioned underneath the lifting surface having cam profiles shaped to lift the lifting surface upon rotation of the cams, a pair of encoders reading a rotation property of each pair of cams, and a controller configured to control movement of the pairs of cams by synchronizing the rotation properties of the pairs of cams by matching output from the encoders. Additionally, methods of lifting a load using an automated lifting cart including cams with a movement profile and a load profile, and methods of synchronizing drive shafts in a lifting cart using torque current measurements sent from a lead motor to a lag motor.

26 Claims, 29 Drawing Sheets

(56) References Cited

U.S. PATENT DOCUMENTS

| | | | |
|---|---|---|---|
| 5,388,657 A * | 2/1995 | Shiraishi | B65G 7/02 |
| | | | 180/168 |
| 6,280,135 B1 | 8/2001 | Cunningham | |
| 6,400,452 B1 | 6/2002 | Maynard | |
| 6,493,614 B1 | 12/2002 | Jung | |
| 6,550,523 B1 | 4/2003 | Chen | |
| 6,652,213 B1 * | 11/2003 | Mitchell | B65G 1/0492 |
| | | | 414/279 |
| 8,628,289 B1 | 1/2014 | Benedict et al. | |
| 2004/0193339 A1 * | 9/2004 | Hulden | G05D 1/0272 |
| | | | 701/23 |
| 2004/0210343 A1 | 10/2004 | Kim et al. | |
| 2005/0118003 A1 * | 6/2005 | Mitchell | B65G 1/0414 |
| | | | 414/284 |
| 2010/0316469 A1 * | 12/2010 | Lert | B65G 1/137 |
| | | | 414/273 |
| 2012/0297559 A1 | 11/2012 | Lee et al. | |
| 2013/0129456 A1 | 5/2013 | Salichs et al. | |
| 2014/0271069 A1 * | 9/2014 | Salichs | B65G 1/065 |
| | | | 414/495 |

FOREIGN PATENT DOCUMENTS

| | | | | |
|---|---|---|---|---|
| EP | 2308778 A2 * | 4/2011 | | B60S 5/06 |
| JP | 2000142908 A * | 5/2000 | | |
| JP | 2011079613 A | 4/2011 | | |
| JP | 2013227746 A * | 11/2013 | | |
| WO | 2015/058192 A1 | 4/2015 | | |
| WO | 2015/112665 A1 | 7/2015 | | |

OTHER PUBLICATIONS

International Search Report and Written Opinion for PCT/US2014/061372, dated Feb. 4, 2015.
Extended European Search Report dated Oct. 12, 2017 for EP Patent Application No. 15758349.3.
International Search Report and Written Opinion for PCT/2015/018530, dated Jul. 2, 2015.
Chinese Office Action dated Aug. 28, 2018 for Chinese Patent Application No. 201500222160.

* cited by examiner

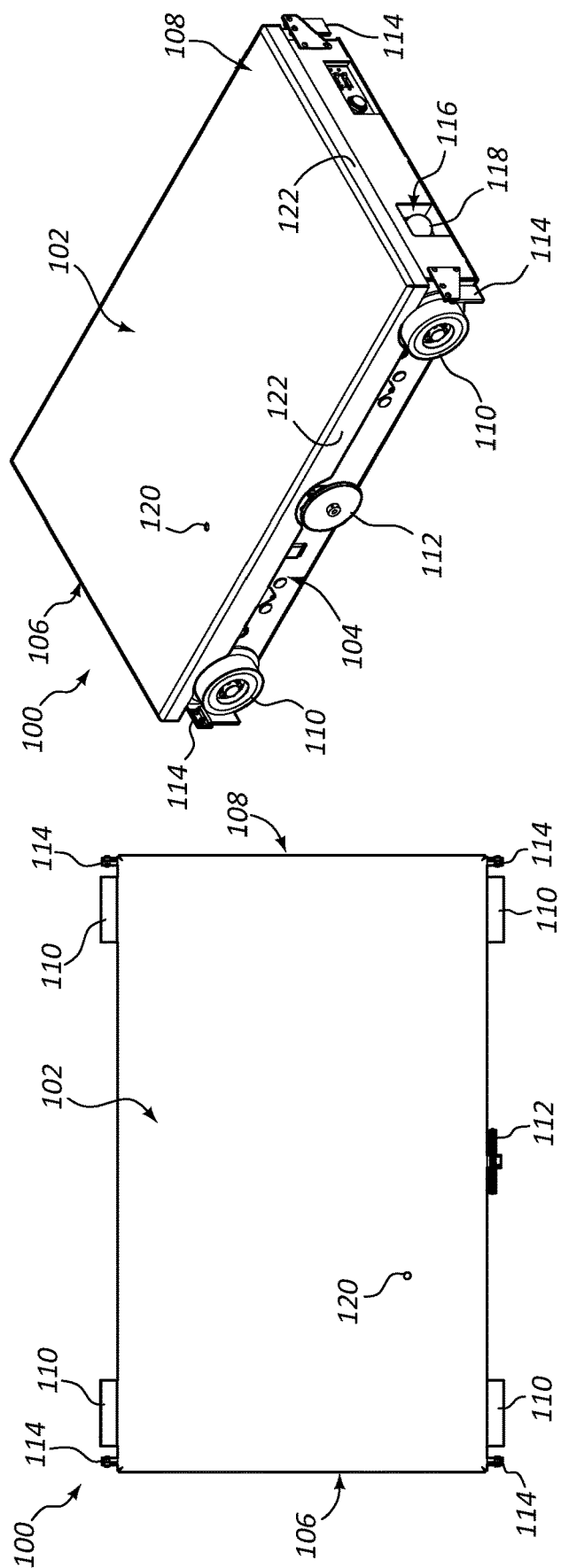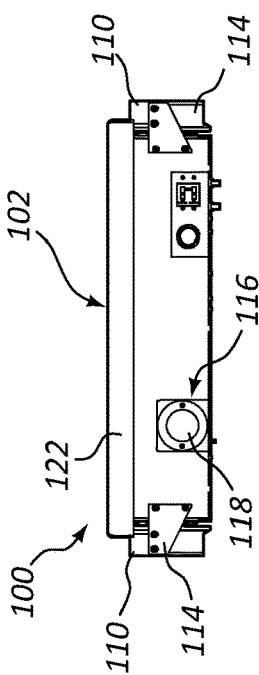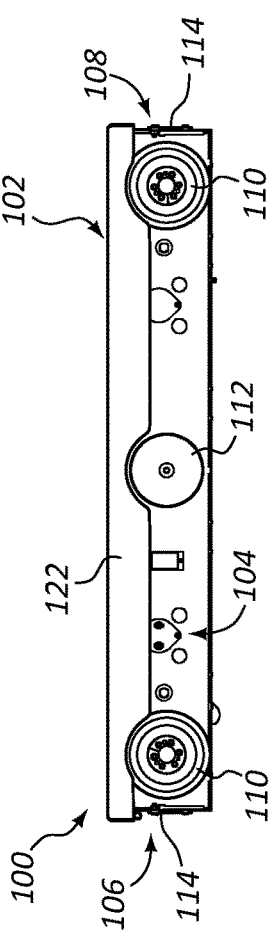

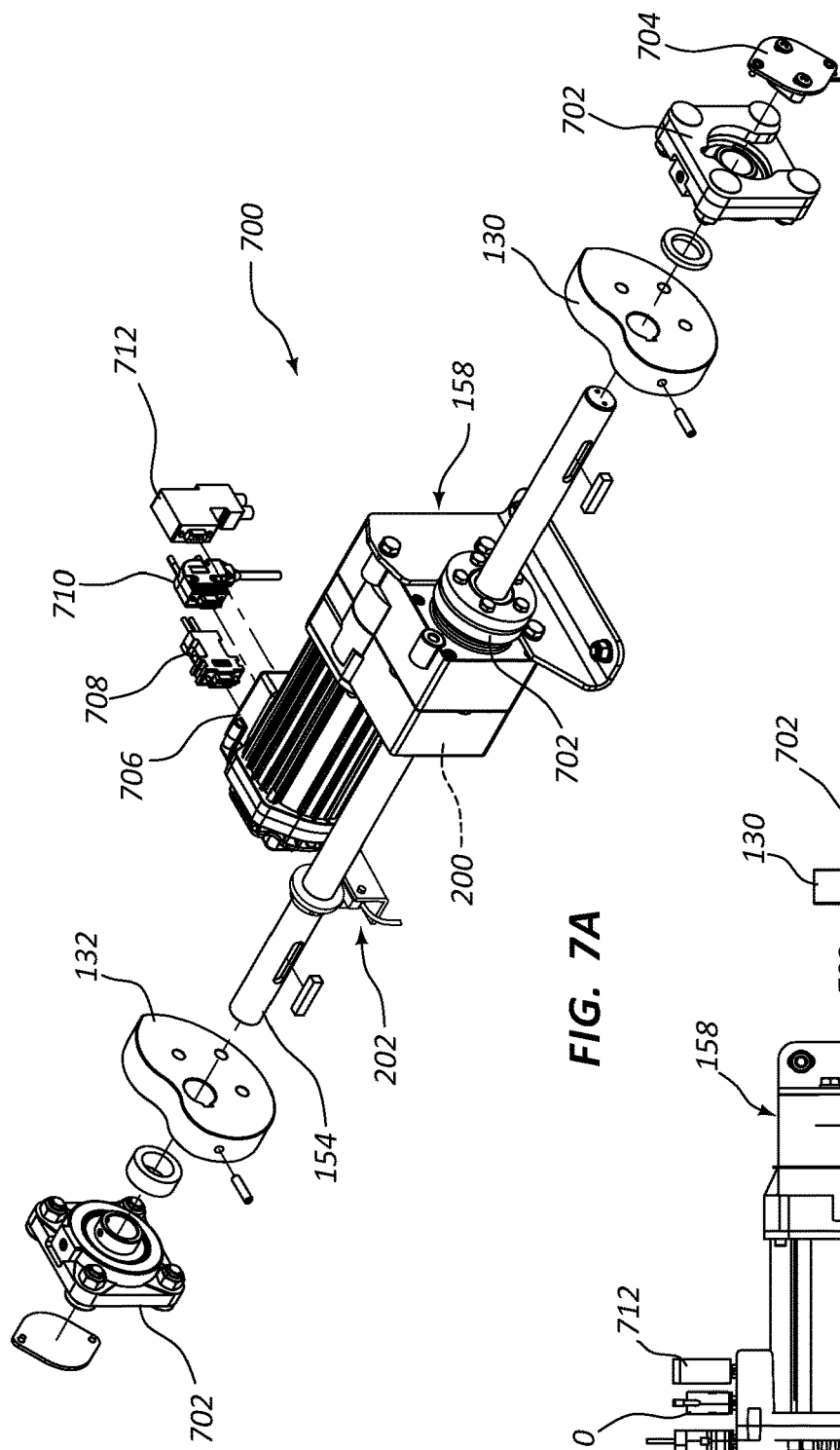
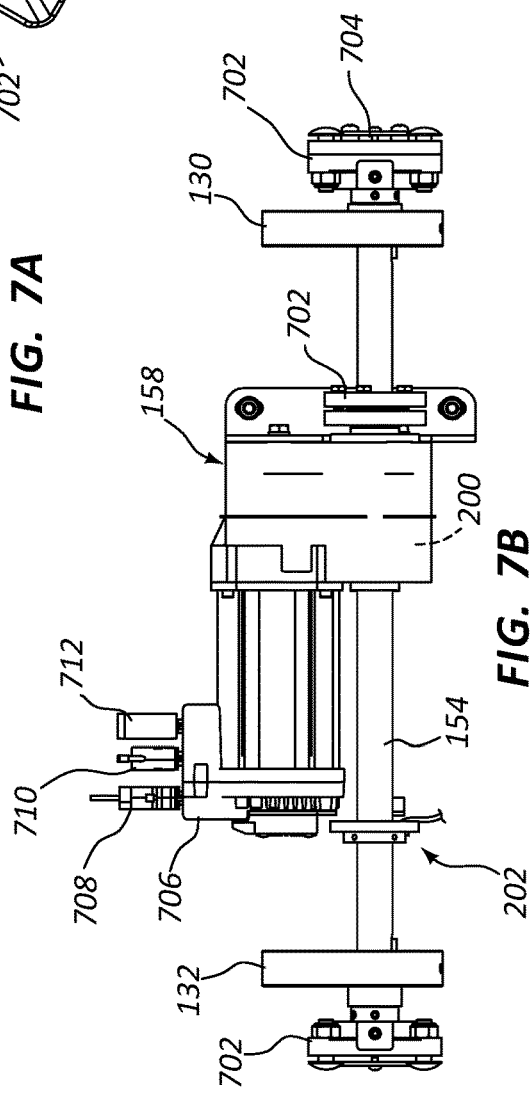
FIG. 7A
FIG. 7B

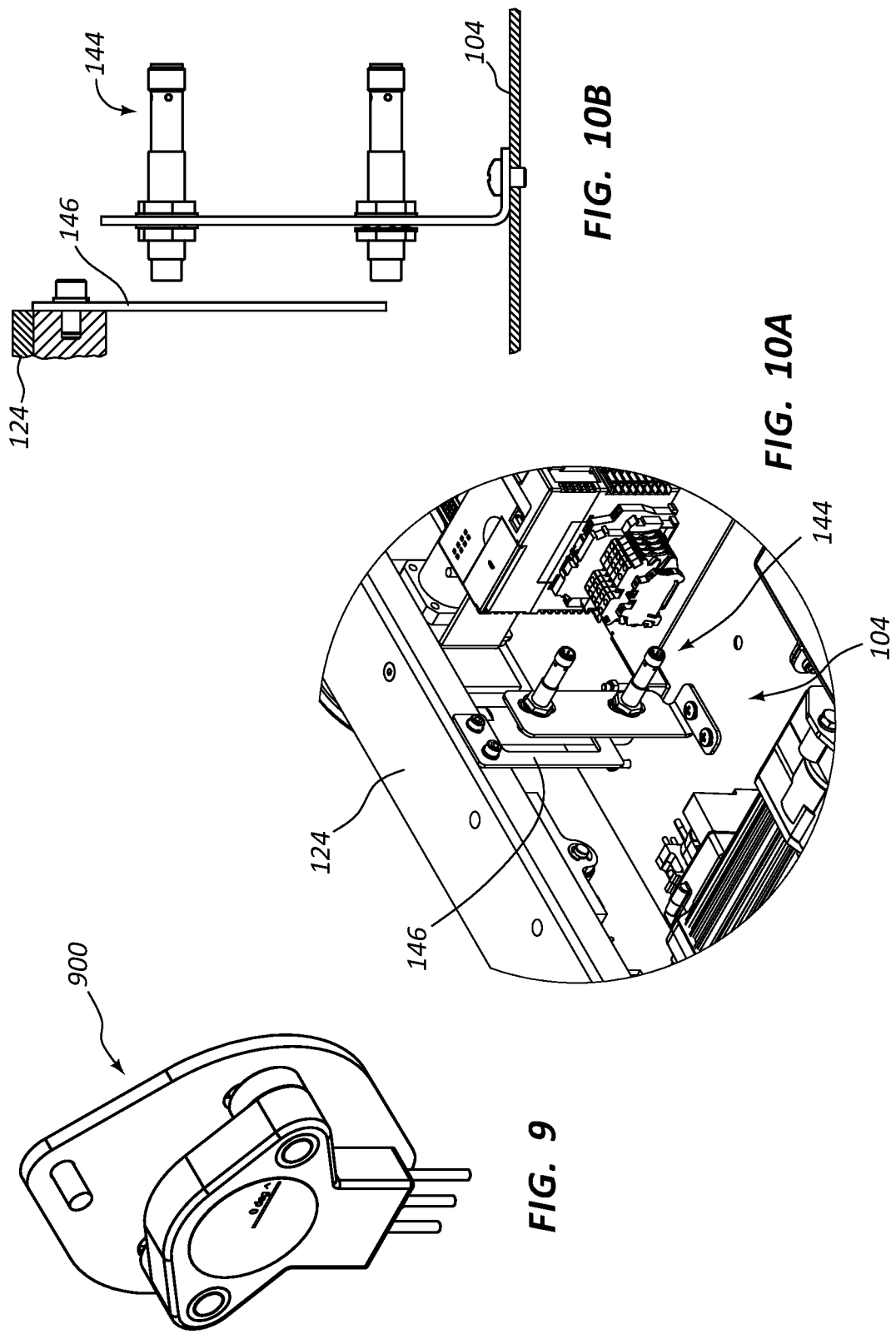

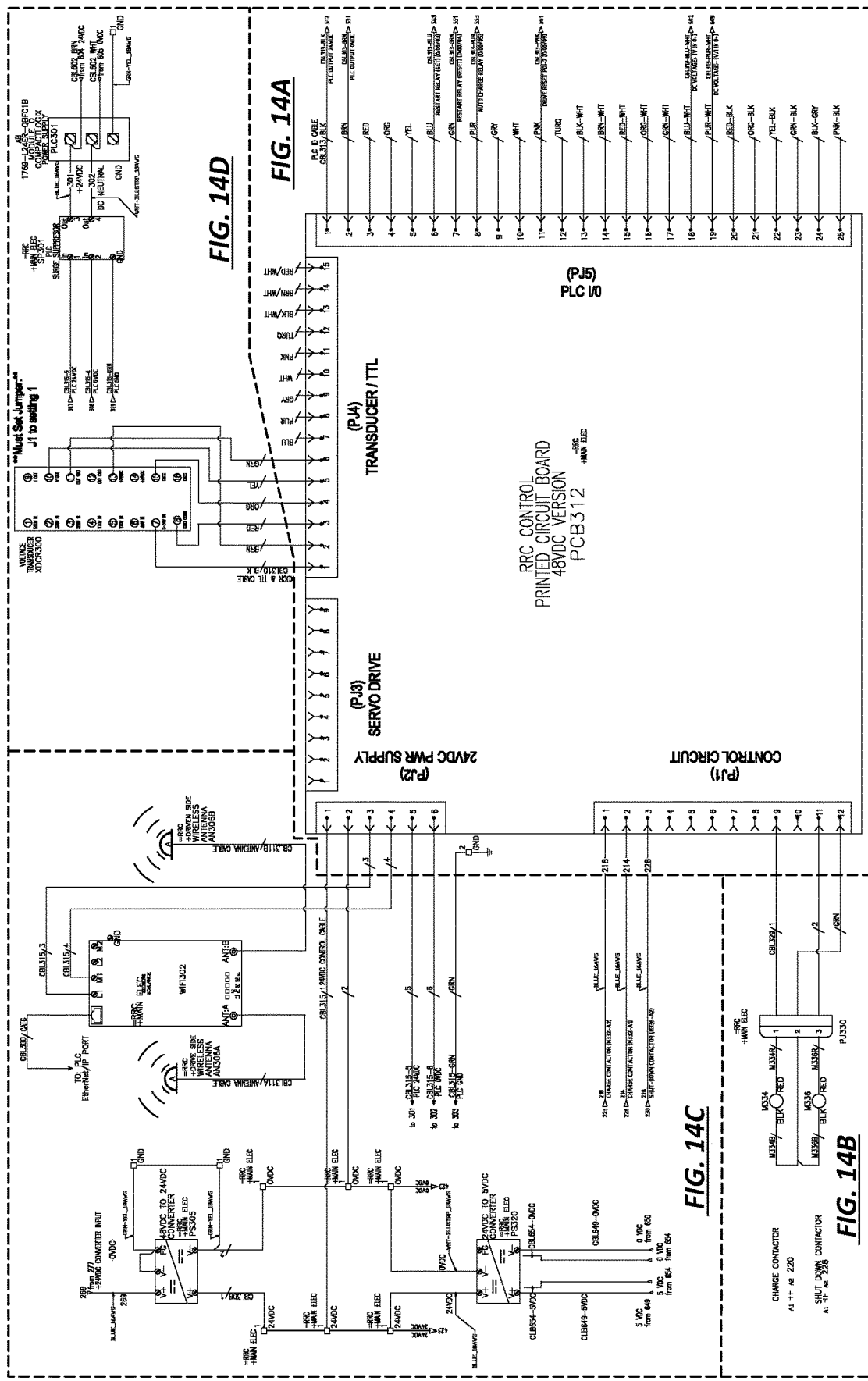

AUTOMATED LIFTING STORAGE CART

TECHNICAL FIELD

The following relates generally to automated storage and retrieval systems (AS/RS) and relates specifically to apparatus, systems, and methods for lifting and moving loads using an automated lifting storage cart in a railway for storing and retrieving palletized material in an automated warehouse.

BACKGROUND

Automated warehouses and automated storage and retrieval systems (AS/RS) can reduce costs, pilferage, and damage in storing goods in part because far fewer workers are needed for otherwise similar operations. In typical AS/RS systems, a crane-like apparatus attached to the ceiling and floor of the warehouse is used to transport and position loads. Some systems have developed motorized carts which are used to transport, access, and store pallets of material in multi-story railed structures. For example, in a warehouse, a product on a pallet may be lifted and retracted into a loading elevator shaft by a forklift-like attachment (FLA). The load is transported to a desired level of the railway, removed from the elevator, and placed on a temporary pallet support near the elevator. Next, an aisle cart corresponding to the level where the load was transported moves underneath the load. A lifting row cart is positioned on top of the aisle cart and actuates a lifting mechanism to remove the load from the temporary pallet support. The aisle cart then transports the load and row cart down the aisle to a designated row, where the row cart separates from the aisle cart while carrying the load down a row railway to the final destination of the load. When a load is retrieved from the storage structure, the process is reversed. These actions are typically all automated by a control center at the warehouse.

Typically, a row cart lifts and carries a load on an upper lifting surface as it moves through railways. In one example, the lifting surface is lifted by a central vertically-oriented cylindrical cam via cam followers bolted to the underside of the lifting surface, such as to a support frame under a lid of the lifting surface. When the central cam is rotated, the lid is raised and lowered due to the motion of the cam followers along the cam profile surface. The cart then moves about the railway and lowers the load by again rotating the cam so that the cam followers move to a lower cam profile surface. In some cases, the entire load is centrally supported by a total surface area of approximately twelve square inches. The small size of the support area may lead to instability of the load on the lifting surface at least in part because of the rate by which the cart accelerates and decelerates as it moves through the railway. High acceleration may cause the load to tilt, teeter, twist, and move as it is carried by the row cart, leading to problems such as catching on other structures in the area, becoming imbalanced and disheveled, and thus applying uneven stresses to the central cam and lifting surface. As a result, the central lifting cam cart may generally function disorderly and imprecise.

Row carts are generally small and light, and are designed to lift, move, and lower pallet loads efficiently. Presently-used central cams can throw loads off-balance or cause damage to cam motors when they move the loaded lifting surface from a full down position to a full up position. These undesirable effects can be minimized in part by driving the cams relatively slowly, but this solution also wastes time in the busy warehouse setting. As long as a row cart remains in a row railway, there is less time available for other row carts to use at least that portion of the row railway. The availability of the aisle cart matched with the row cart and other components in the chain of events of the AS/RS system may also be dependent upon the speed with which the row cart can perform its duties.

Some row carts may have multiple cam shafts or drive axles for cams or wheels on the cart. All of these components often must be synchronized in rotation for the cart to operate properly. Typically, a chain and sprocket or a belt running from one of the shafts to another synchronizes the rotation of one shaft with the other. This design is not ideally low-profile, not easy to maintain and assemble, not conservative of its energy source, and not efficient in its use of the space within its enclosure. The mechanical linkages often require the cart to be larger, and require lubrication, repositioning of wandering sprockets, other maintenance, and periodic examination for safety. They also waste power output of the motor (and therefore onboard energy storage) through transmission losses. Furthermore, they take up valuable space inside the limited area available in the cart.

Existing lifting carts are difficult and time-consuming to maintain as well, since access to the internal components typically requires a technician to take time to at least partially disassemble portions of the cart, make the necessary inspections and repairs, and then take time again to reassemble the cart to its original state.

DISCLOSURE OF THE INVENTION

According to at least one embodiment, an apparatus for lifting a load on an automated lifting cart is provided. The apparatus includes a lifting surface connected to the lifting cart and vertically movable relative to the lifting cart. The apparatus also includes a first and a second pair of cams that are positioned underneath the lifting surface and that have cam profiles shaped to lift the lifting surface upon rotation. The apparatus additionally includes a first encoder which may be operable to read a rotation property of the first pair of cams and a second encoder which may be operable to read a rotation property of the second pair of cams. The apparatus also includes an electronic controller configured to control rotational movement of each of the first and second pairs of cams and synchronize the rotation properties of the first and second pairs of cams by matching output from the first and second encoders.

In some embodiments, the cam profiles of the first pair of cams may be the reverse of the cam profiles of the second pair of cams. The first pair of cams may therefore also be configured to rotate in an opposing direction from the second pair of cams. In some cases, the cam profiles are asymmetrically bean-shaped. The cam profiles may include a movement profile portion and a load profile portion, wherein the movement profile portion lifts the lifting surface more quickly than the load profile portion upon rotation of the pairs of cams. The movement profile portion may be configured in the cam profile to lift the unloaded lifting surface before the load profile portion lifts the loaded lifting surface. In some embodiments, rotation of the first and second pairs of cams through the movement profile portions lifts the lifting surface prior to the lifting surface contacting a load, and the load profile portions lift the lifting surface from about when the lifting surface contacts the load.

In some embodiments, the apparatus may also include a plurality of cam followers extending below the lifting surface to contact the first and second pairs of cams. The contact points of the cams or cam followers below the lifting surface may form a rectangle beneath the lifting surface. The apparatus may also include at least one stabilizer (e.g., a linear motion stabilizer) connecting the lifting surface to the lifting cart, wherein the stabilizer may isolate movement of the lifting surface to substantially vertical translation.

In some configurations, the rotation properties read by the first and second encoders may be used to determine angular position vectors.

The lifting surface of the apparatus may comprise a lid and a support frame. The support frame may be below the lid and may be attached to the lid by a hinge. Rotating the lid about the hinge may provide access to an area of the cart underneath the lid. The first and second pairs of cams may be positioned underneath the support frame and may lift the support frame along with the lid when the cams rotate.

The apparatus may further include a first and a second motor, wherein the first motor may drive rotation of a first cam shaft linked to the first pair of cams and the second motor may drive rotation of a second cam shaft linked to the second pair of cams. Additionally, the first encoder may be integrated with at least the first motor. These motors may be hollow bore motors.

In another exemplary embodiment, a method of lifting a load of an automated lifting cart is provided. The method includes steps such as (a) providing a lifting cart in a railway, where the lifting cart comprises a lifting surface liftable relative to the lifting cart via rotation of a plurality of cams and the plurality of cams each has a movement profile surface and a load profile surface; (b) positioning the lifting cart below a load spaced above the railway with the lifting surface in a declined position; (c) rotating the plurality of cams to raise the lifting surface along the movement profile surfaces, thereby moving the lifting surface from the declined position to at least near to a contact position with the load; and (d) rotating the plurality of cams to raise the lifting surface along the load profile surfaces, thereby moving the lifting surface from the contact position to a loaded position relative to the lifting cart. The load profile surfaces in this method raises the lifting surface at a lower rate per degree of rotation of the cams than the movement profile surfaces.

In some embodiments, positioning the lifting cart below a load further may include detecting a position of the load above the lifting cart using a sensor on the lifting cart. The sensor may detect the load through the lifting surface.

The method may also include providing a first cam shaft connected to a first pair of the plurality of cams and a second cam shaft connected to a second pair of the plurality of cams, reading a rotation property of the first cam shaft, and driving rotation of the second cam shaft based on the rotation property of the first cam shaft. In some configurations, the rotation property may be a home position of the first cam shaft, and the second cam shaft may be driven to a corresponding home position.

The method may also include repositioning the lifting cart and the load in the loaded position to a destination position and rotating the plurality of cams to lower the lifting surface from the loaded position to the declined position, thereby resting the load at the destination position.

In another aspect, an automated lifting cart is disclosed, comprising a base structure and a front and a rear pair of wheels. A first drive motor drives the front pair of wheels, and a second drive motor may drive the rear pair of wheels, wherein the first and second drive motors drive movement of the lifting cart. A lifting surface is connected to, and vertically movable relative to, the base structure, due to a first and a second pair of cams, where each pair of cams may be positioned underneath the lifting surface and may have a cam profile shaped to lift the lifting surface upon rotation. A first cam shaft is operable to rotate the first pair of cams, and a second cam shaft may be operable to rotate the second pair of cams. A first cam motor drives the first cam shaft, and a second cam motor may drive the second cam shaft, wherein the first and second cam motors drive movement of the lifting surface relative to the base structure.

In some embodiments, this automated lifting cart may also include an energy storage system on the lifting cart, wherein the energy storage system provides energy to the first and second drive motors and to the first and second cam motors. Furthermore, the energy storage system may be a lithium-ion battery. The motors (e.g., the drive motors and cam motors) may be hollow bore motors. The drive motors and cam motors may all be independently controlled.

Another embodiment may provide a method of synchronizing drive shafts in an automated lifting cart by (a) providing a lead motor driving a first drive shaft of the lifting cart and a lag motor driving a second drive shaft of the lifting cart, wherein the lead motor has a torque current; (b) measuring the torque current; and (c) sending the measurement to the lag motor via a communication bus linking control of the lead motor to control the driving of the lag motor. The lag motor may then be driven to match the torque current of the lead motor.

In some cases, rotation of the first drive shaft may drive at least a first wheel positioned to move the lifting cart, and rotation of the second drive shaft may drive at least a second wheel positioned to move the lifting cart. In some embodiments, rotation of the first drive shaft drives at least a first cam positioned to lift a support structure of the lifting cart, and rotation of the second drive shaft drives at least a second cam positioned to lift the support structure.

The foregoing and other features, utilities and advantages of the invention will be apparent from the following more particular description of preferred embodiments of the invention and as illustrated in the accompanying drawings.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 1A is an orthographic view of a lifting cart with a lid shown closed in accordance with an exemplary embodiment of the present disclosure.

FIG. 1B is a top view of the lifting cart of FIG. 1A.

FIG. 1C is a left side view of the lifting cart of FIG. 1A.

FIG. 1D is a rear end view of the lifting cart of FIG. 1A.

FIG. 7A is an exploded orthographic view of a cam drive assembly of an exemplary embodiment of the present disclosure.

FIG. 7B is a top view of the cam drive assembly of FIG. 7A.

FIG. 9 is an orthographic view of a cam sensor of a lifting assembly according to an exemplary embodiment of the present disclosure.

FIG. 10A is a close up orthographic view of a proximity sensor assembly of an exemplary embodiment of the present disclosure.

FIG. 10B is a side view of the proximity sensor assembly of FIG. 10A.

Figure 1E:
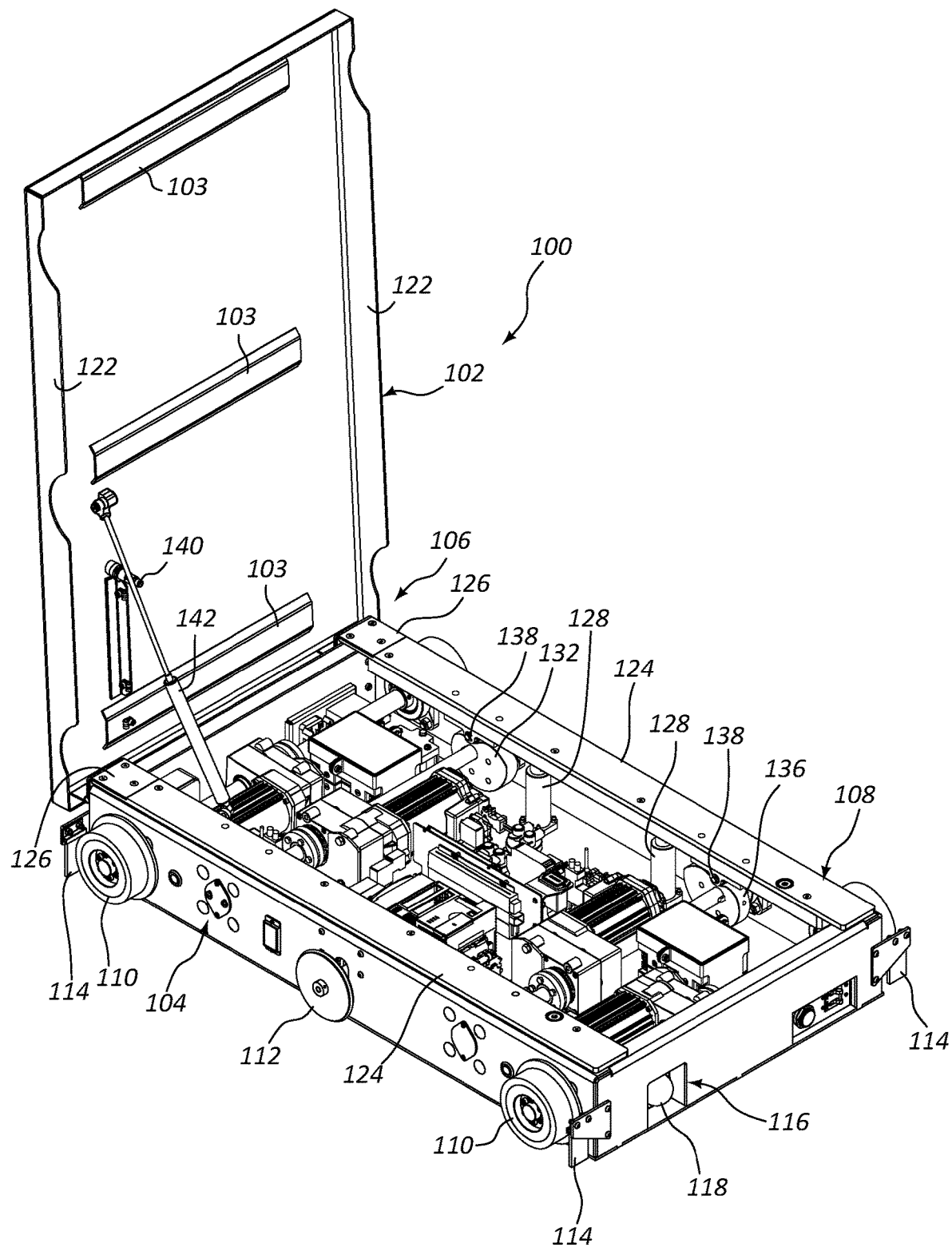
FIG. 1E is an orthographic view of the left side of the lifting cart of FIG. 1A with the lid shown open.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

BEST MODE(S) FOR CARRYING OUT THE INVENTION

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. The methods described may be performed in an order different from that described, and various steps may be added, omitted, or combined. Also, features described with respect to certain embodiments may be combined in other embodiments. For example, various apparatuses and systems disclosed herein for an automated lifting storage cart may be combined in some embodiments, such as a four-cam lifting apparatus combined with a hinged lid apparatus.

Embodiments of the present disclosure may provide systems, apparatus, and methods for implementing an automated lifting storage cart. An automated lifting storage cart may be a rail cart referred to herein as a row cart, row rail cart, aisle rail cart, aisle cart, or lifting cart based on the exemplary embodiments disclosed herein related to AS/RS systems, but the principles and teachings of the present disclosure may be applied and adapted to railed vehicles in any environments, including, but not limited to, trains, roller coasters, road-rail vehicles, and other railed vehicles and railway-traveling devices. Some embodiments may show or describe a row cart, but features and embodiments of an aisle cart or related other cart in a railway system may be interchangeable with the features of a row cart. Thus, a "lifting cart" may be a row cart or an aisle cart.

In at least one embodiment, a system for positioning a lifting cart may include a lifting cart and a controller. The lifting cart may have motorized wheels that engage the railway of a storage area in an automated storage facility and may be configured to move about portions of the railway to lift, transport, and reposition loads (e.g., palletized loads). The controller may be a computer system or control station located at the storage facility, such as a central control station or a computer system onboard the lifting cart. The control system may send control signals to the cart periodically, such as every few seconds, or substantially continuously.

A plurality of cams may be positioned under a lifting surface or lid of the lifting cart to lift and lower the support relative to the base chassis or enclosure of the cart. These cams may rotate in a vertical plane. In some embodiments, the cams may be synchronized in their rotation and thereby provide even lifting at each point of contact with the lifting surface (or with cam followers connected between the lifting surface and cams). The synchronized cams may also rotate in opposite directions and have corresponding opposite cam surfaces. This feature may minimize lateral movement, side loading, and stress on the lifting surface by canceling out forces in each direction on the lifting surface and related stabilization elements. Additionally, the plurality of cams may be spaced out underneath the lifting surface, thereby providing additional stability to the load as the cart accelerates and decelerates through the railway and preventing undesired movement of the load relative to the lifting surface. In some embodiments, the cams may be spaced out to form the corners of a rectangle underneath the lifting surface.

The cams may have synchronized rotation due to a controller commanding a position move based on cam shaft position feedback and monitoring position error from motor encoders. Multiple motors may drive multiple cam shafts and multiple encoders may monitor and track the movement of the cam shafts so that all cams can be controlled to match each others' speed and rotation position. By using multiple motors grouped with their own cam shafts, space within the lifting cart used by lifting components may be conserved and power transmission losses may be reduced. Furthermore, less maintenance, and therefore downtime, is required for the cart than would be required using linking mechanisms such as chains and sprockets or belts.

In some embodiments, two or more drive shafts may be linked to four or more wheels. The drive shafts may also have synchronized rotation due to programmed and monitored motor control. Encoders may track the speed and rotation of the drive shafts and their output may be used to ensure that the wheels are synchronized as they drive the cart. In some embodiments, the drive shafts may be synchronized by monitoring torque current from a lead motor and sending that current value to a lag motor through a cart-based communication bus that links the drive motors' controls.

Some configurations shown herein may have a lifting structure that accommodates mounting of cam followers yet includes a hinged lid feature. This may allow quicker and easier access to internal components than carts where lifting structure must be even partially disassembled for many maintenance or inspection tasks. The hinged lid may be further secured by magnets, and the cart may operate dependent on whether or not the lid is oriented in a closed position.

In some aspects of the present disclosure, cams of a lifting cart may comprise multiple cam profile portions. For example, a cam may have a movement profile portion and a load profile portion. When a cam follower follows the movement profile portion, the cam may drive the cam follower in a vertical direction at a higher speed per degree of rotation than a load profile portion of the same cam. Thus, when the cart receives instructions to lift a load and the cams are rotated, the lifting surface may move quickly as the cam followers contact the movement profile portion, and then the lifting surface may move more slowly as the cam followers reach the load profile portions. In some arrangements, the movement profile portion is designed to lift the lifting surface from a lowered or declined position to a position where the lifting surface comes into contact (or nearly does so) with a load above the cart, and the load profile portion lifts the lifting surface from at least the point of contact with the load to the fully raised position of the lifting surface.

By moving the lifting surface more quickly through the movement profile portion, the row cart occupies the row railway for a shorter length of time, and the slower movement of the lifting surface as the load is reached provides mechanical advantage in lifting the load. Thus, there is a decreased risk of damage to cam motors and other lifting-related components. Time may be saved again if the cart is unloaded by running the cams in reverse. Overall, increasing the speed by which the cart can lift and move loads may allow more actions to be completed in a given length of time, and may improve time efficiency of other components that are related to the lifting cart, such as, for example, aisle carts and elevator mechanisms in an AS/RS system of which the lifting cart is a part.

A controller of the cart may receive the output of an encoder (e.g., a positional vector such as angular displacement, angular velocity, and/or angular acceleration of a motor or other rotating element) and determine a rotation count. The controller may then convert the rotation count into the distance traveled by the lifting cart.

Figure 1F:
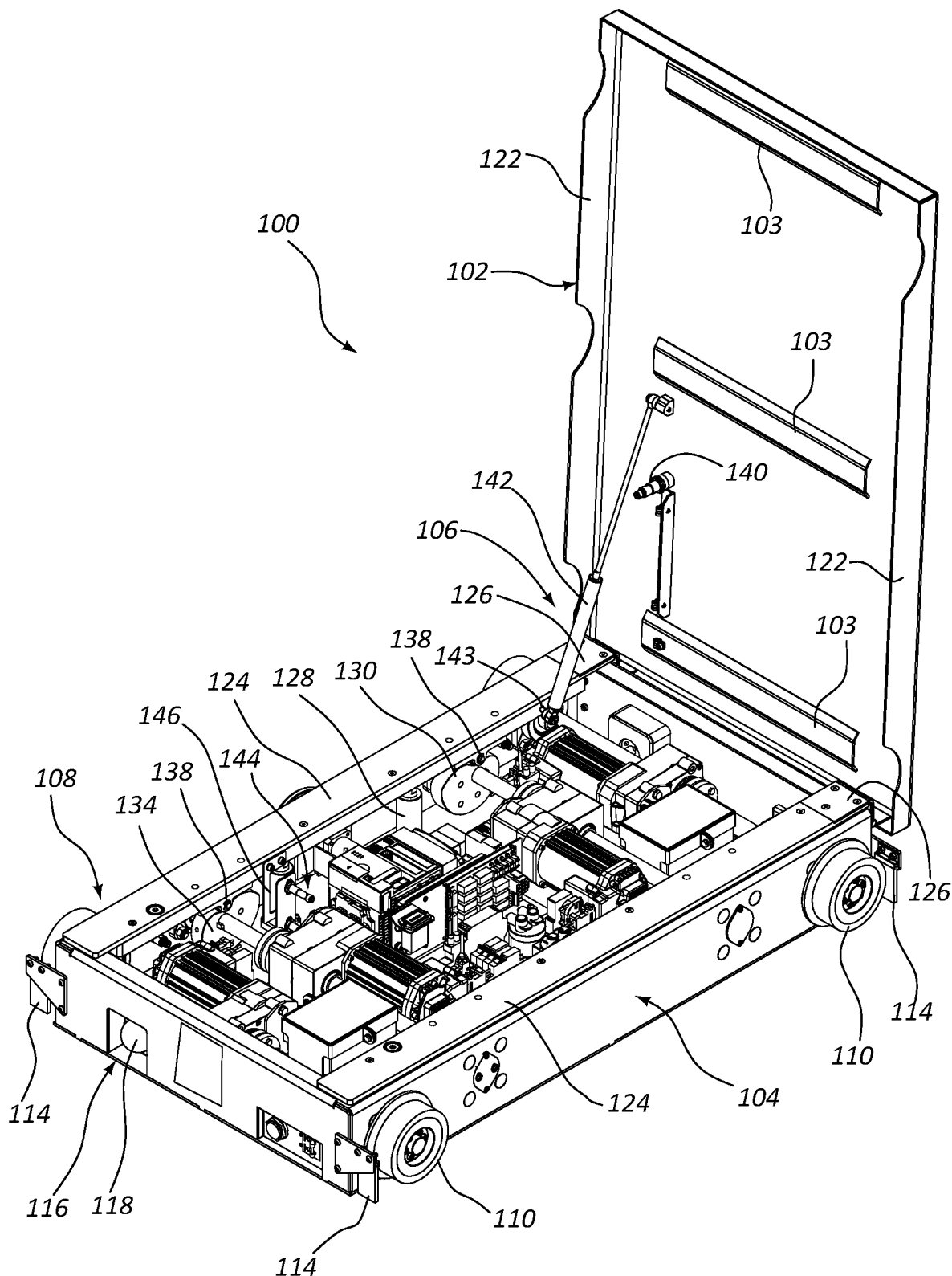
FIG. 1F is an orthographic view of the right side of the lifting cart of FIG. 1E.
Figure 1G:
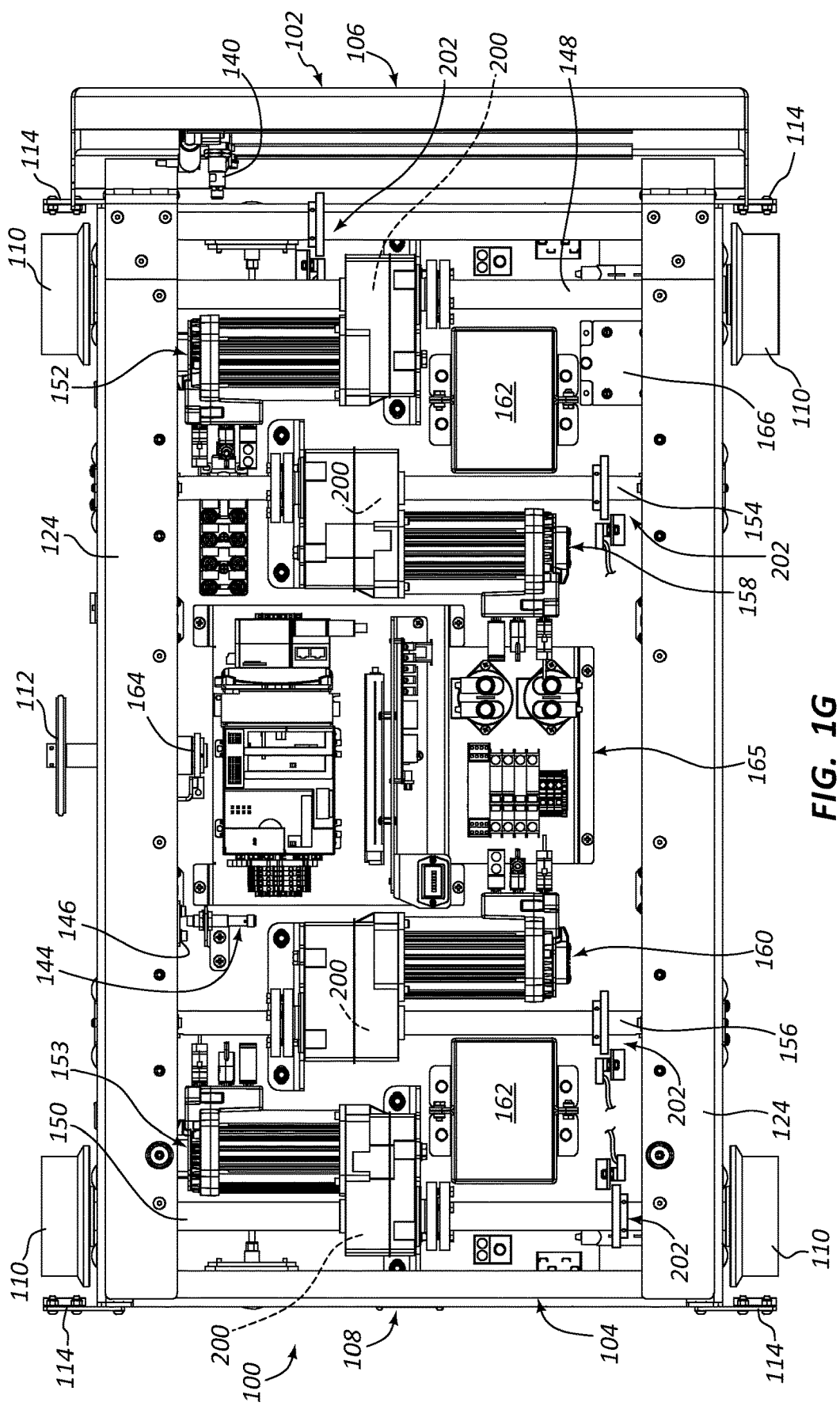
FIG. 1G is a top view of the lifting cart of FIG. 1E.

Additional embodiments and features will be discussed or apparent in connection with the figures and the following detailed description. FIGS. 1A-1G show various views of a lifting cart 100, specifically a row rail cart (RRC), having various features of the present systems, apparatuses, and methods. FIGS. 1A-1D show views of the lifting cart 100 with a lid 102 shown closed. FIG. 1A is an orthographic view, FIG. 1B is a top view, FIG. 1C is a left side view, and FIG. 1D is rear side view. FIGS. 1E-1G show views of the lifting cart 100 with the lid 102 in an open position. FIGS. 1E and 1F are orthographic views of the left and right sides of the cart 100, respectively, and FIG. 1G is a top view.

Referring in particular to FIGS. 1A-1D, the cart 100 includes a base enclosure 104 having a front end 106 and rear end 108. Four drive wheels 110 and an encoder wheel 112 may extend laterally from the sides of the cart 100. Brush assemblies 114 may be positioned adjacent to the drive wheels 110. The front and rear ends 106, 108 may include inset housings 116 for transceiver antennae 118. The lid 102 may include a port 120 for a photo sensor 140 (see infra, FIG. 1E and related description).

The lid 102 may be an at least generally planar structure acting as a support surface for a pallet, load, palletized load, or other material or load to be lifted by the lifting cart 100. A generally planar top surface of the lid 102 may provide versatility in the kinds of loads lid 102 can carry. In some embodiments, the lid 102 may be fluted, formed with ridges, or include protrusions or other structural elements to improve the rigidity, strength, weight distribution, and/or security of retention of a load on its top surface. For example, the lid 102 may include surface features shaped to fit between slats in a pallet, thereby preventing rotation of the load while borne by the lifting cart 100. See also FIGS. 1E-1F showing reinforcements 103 on the underside of the lid 102. The lid 102 may comprise side surfaces 122 extending around at least a portion of the perimeter of the top surface of the lid 102, which provide protection to the lid 102 and components underneath the lid 102. The lid 102 may be lifted substantially vertically relative to the base enclosure 104 by cams 130, 132, 134, 136 within the base enclosure 104 (see infra, FIGS. 1E, 1F, and related description). While lifted, the side surfaces 122 may cover clearance between the lid 102 and the base enclosure 104 created by the movement of the lid 102. In some embodiments, the side surfaces 122 may have cutout portions to prevent interference with the drive wheels 110, brush assemblies 114, the encoder wheel 112, and/or other elements on the sides of the base enclosure 104.

The base enclosure 104 may be substantially rectangular in shape, as shown in the figures, but may also have another shape. The base enclosure 104 houses many of the components of the lifting cart 100, and therefore may be constructed of a tough, rigid material such as, for example, steel or aluminum. In some embodiments, the base enclosure 104 may be reinforced by fluting, corrugations, layers, composite layers, and the like to improve rigidity and/or reduce weight. Specifically, openings in the base enclosure 104 for the drive wheels 110, axles connected thereto, or other external components may be reinforced to improve structural integrity. The base enclosure 104 may be positioned below the lid 102. The base enclosure 104 may also be referred to as a housing chassis.

The drive wheels 110 may extend outward from the sides of the base enclosure 104 to a position configured to engage the railway in which the lifting cart 100 will be operated. In some embodiments, the drive wheels 110 may beneficially comprise urethane or another similar polymer providing grip for the lifting cart 100 when running along metal (e.g., steel) rails. For example, the drive wheels 110 may be entirely urethane. In another example, the drive wheels 110 may comprise a steel core with a urethane rail contact surface that extends around the circumference of the wheel that contacts the railway. Such steel-reinforced drive wheels 110 may beneficially provide less deformation under load than entirely urethane wheels while still providing improved grip over all-steel wheels.

Figure 15:
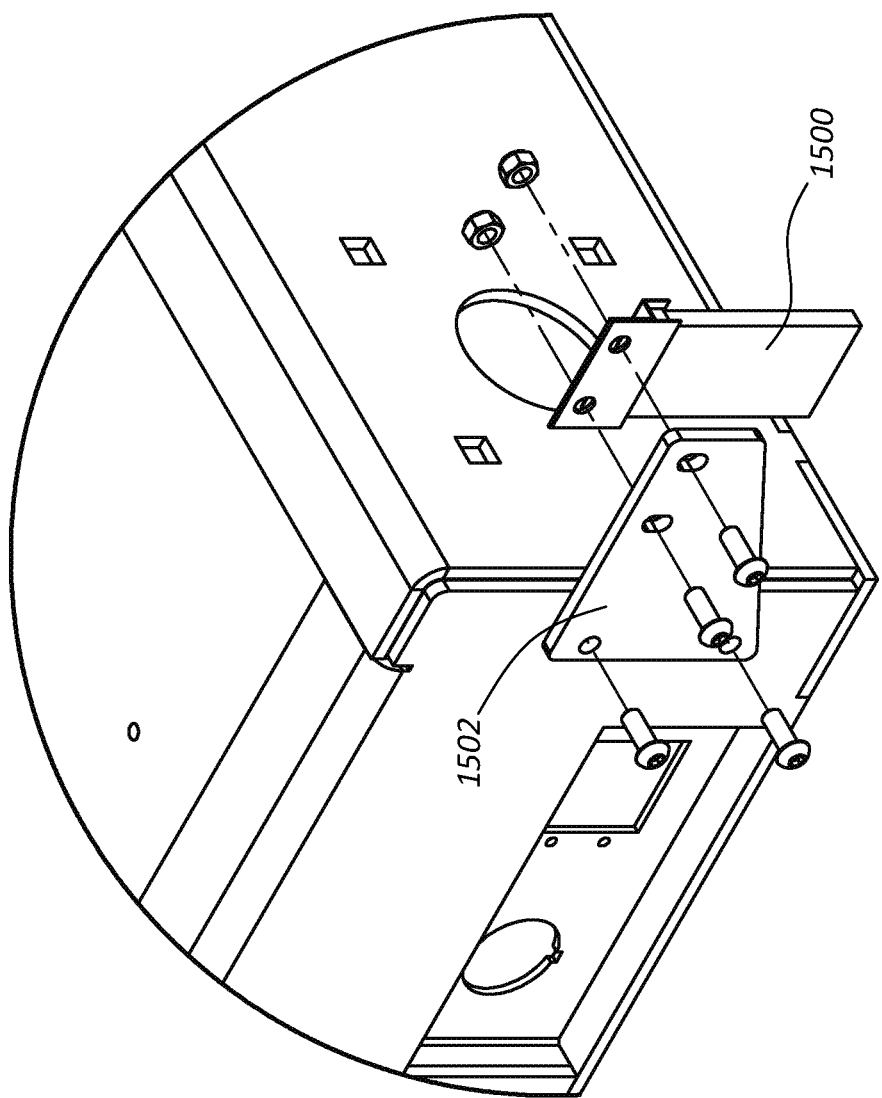
FIG. 15 is a close-up exploded orthographic view of an exemplary brush attachment assembly of a lifting cart of the present disclosure.

Drive wheels 110 comprising urethane and other similar materials may generate static electricity while rolling on steel railways, and brush assemblies 114 may therefore in some embodiments be provided to dissipate static buildup. The brush assemblies 114 may be configured of a material that disperses static electricity or collects static electricity, such as for providing additional charge to batteries in the lifting cart 100. In some configurations the brush assemblies 114 may clear the railway of dust and debris, thereby improving the consistency of traction of the drive wheels 110 and encoder wheel 112. The brush assemblies 114 may therefore be positioned to the front of the drive wheels 110 of the front end 106 and positioned to the rear of the drive wheels 110 of the rear end 108. A close-up exploded view of a brush assembly 114 is shown in FIG. 15.

An encoder wheel 112 may extend outward from the side of the base enclosure 104. In some embodiments, the encoder wheel 112 may be vertically oriented (e.g., as shown in FIG. 1A), and in some embodiments it may be horizontally oriented, extending below or to the side of the base enclosure 104 or through a slot in the base enclosure 104 to come into contact with the railway. The encoder wheel 112 may beneficially be comprised of a rigid material that maintains grip to the railway as the lifting cart 100 moves. For example, the encoder wheel 112 may beneficially have a urethane or rubber outer surface to maintain friction with the railway. The encoder wheel 112 may alternatively be referred to as a fifth wheel of the lifting cart 100 or as an element of a fifth wheel encoder of the lifting cart 100. In some arrangements the encoder wheel 112 may have an independent suspension from the drive wheels 110. In these arrangements the encoder wheel 112 thereby may not be subject to the load on the lid 102 that is borne by the drive wheels 110 which may cause them to deform. The lack of deformation of the encoder wheel 112 may provide a reliable determination of distance traveled by the lifting cart 100, even when under load. The encoder wheel 112 may maintain its shape characteristics after the load is removed as well. In some embodiments, the encoder wheel 112 may have its own encoder, such as internal encoder 164 (see FIG. 1G).

The transceiver antenna 118 may provide communication between the lifting cart 100 and an external controller or monitor system via another transceiver connected thereto. In such embodiments, a "transceiver" may refer to a transmitter, a receiver, or a transmitter/receiver. The transceiver antenna 118 may be part of an electromagnetic transceiver system, such as a radio frequency (RF) system, a global positioning system (GPS), a wireless network connection (e.g., wi-fi), a Bluetooth® or Zigbee® connection, or related wireless communication systems. In some embodiments the transceiver antenna 118 may be connected to a controller internal to the base enclosure 104. A transceiver antenna 118 may be located at the front end 106 and the rear end 108 of the base enclosure 104 to provide communication to an external central controller transceiver no matter which side of the base enclosure 104 the external transceiver is located. In some embodiments, transceiver antennae 118 may be positioned to the left, right, top, or bottom sides of the base enclosure 104, depending on the characteristics of the wireless communications field in which the cart 100 is located. Transceiver antennae 118 may be placed in a recessed inset housing 116 to minimize the risk of damage to the antennae 118 and/or to reduce the outside clearance required by the lifting cart 100 in narrow railways and aisle cart retaining means.

Referring now in particular to FIGS. 1E-1F, internal components of the lifting cart 100 are shown when the lid 102 is in a vertical orientation. Support surfaces 124 (i.e., support frames) are shown immediately below the underside of the lid 102 and support the lid 102 when it is in its horizontal orientation. The lid 102 may be pivoted from the position shown in FIG. 1A where it is in contact with the support surfaces 124 to the position shown in FIG. 1E due to hinges 126 connecting the lid 102 to the support surfaces 124 at the front end 106 of the base enclosure 104. The hinges 126 may provide easy access to the internal components of the base enclosure 104 for repair, maintenance, replacement, and related tasks without needing to remove bolts or completely remove the lid 102. In some embodiments, the hinges 126 may be connected to one or more the side surfaces 122 of the lid 102. The hinges 126 are preferably not connected to the base enclosure 104 to allow the lid 102 to move relative to the base enclosure 104 on top of the support surfaces 124.

The support surfaces 124 may include generally flat support beams running horizontally across the lifting cart 100 from front to back. The support surfaces 124 may be linked to the base enclosure 104 by two vertical stabilizer bearings 128 on each side of the cart 100. Only one of the stabilizer bearings 128 is visible in FIG. 1F. The vertical stabilizer bearings 128 may orient the support surfaces 124 to be level and only move relative to the base enclosure 104 in a substantially vertical direction. In this fashion, the support surfaces 124 and lid 102 remain level when lifted by the cams 130, 132, 134, 136 and do not move laterally relative to the base enclosure 104.

Two front cams 130, 132 and two rear cams 134, 136 move the support surfaces 124 from below cam followers 138 attached to the underside of the support surfaces 124. See also FIG. 1F. In the embodiment shown, each support surface 124 may be linked to one cam of the pair of front cams 130, 132 and one cam of the pair of the rear cams 134, 136. In some embodiments, one support surface 124 may be linked to both front cams and another support surface 124 may be linked to both rear cams. In yet further embodiments, the support surfaces 124 may be linked to each other, such that the resulting single support surface is movable by four cams at once. As used herein, a "lifting surface" may refer to one or more support surface 124 (i.e., support frame) indicated in FIGS. 1E-1G and may alternatively refer to a surface of a lifting cart that may support a load, including, for example, the support surfaces 124 and lid 102 collectively or individually. In some embodiments, the support surfaces 124 and lid 102 may be integrated with or attached to each other, resulting in a single component serving as the lifting surface.

The underside of the lid 102 shows a photo sensor 140. The photo sensor 140 may sense light coming through the port 120 (see FIG. 1A) and thereby be used to determine if the cart 100 is underneath a pallet or other material due to shadows cast on the lid 102 by the pallet or other material. In some embodiments, the photo sensor 140 may be replaced by a proximity sensor such as, for example, an ultrasonic or laser rangefinder, to determine the distance between the lid 102 and the underside of a load positioned above the lid 102. Thus, in some embodiments, the support surfaces 124 may be referred to as support frames or a support frame below the lid 102, in which case the lifting surface may include lid 102 placed on top of the support surfaces/frames 124. In yet other embodiments, a lifting surface may refer to support surfaces 124 and lid 102 as a single structure, such as in embodiments where the support surfaces 124 and lid 102 are integrated or attached together.

An extendable gas spring 142 may be linked to pivot points on the underside of the lid 102 and an inner surface connection point 143 of one of the support surfaces 124 (see FIG. 1F). The gas spring 142 may pneumatically assist in opening and holding up the lid 102 while it is pivoted upward and then allow the lid 102 to return to a horizontal position. In some embodiments, the gas spring 142 may dampen the movement of the lid 102 while it is opened or closed. In FIG. 1G, the gas spring 142 is shown exploded from the pivot points of the inner surface connection point 143 and lid 102.

A pair of proximity sensors 144 may be positioned in the base enclosure 104 to sense the position of the support surface 124 relative to the base enclosure 104. These sensors 144 are discussed in more detail in connection with FIGS. 10A-10B.

FIG. 1G shows the front drive shaft 148 and rear drive shaft 150 attached to the drive wheels 110. The drive shafts 148, 150 are respectively driven by a front drive motor 152 and rear drive motor 153. A front cam shaft 154 and rear cam shaft 156 drive the cams 130, 132, 134, 136 (see FIGS. 1E-1F). The cam shafts 154, 156 are respectively driven by a front cam motor 158 and a rear cam motor 160. In some embodiments, the motors 152, 154, 158, 160 may beneficially be hollow bore gear motors. In such embodiments, the motors 152, 154, 158, 160 may directly drive the motion of each pair of wheels or cams without mechanical drive losses that would be present in a system having a single motor and a drive train transferring power to each drive shaft 148, 150 collectively (e.g., via a chain and sprocket on each drive shaft 148, 150). Additionally, in some applications lower power motors may be used, thereby conserving enclosure space or allowing the cart 100 to be smaller, since lower power motors may be more compact than a single, higher-power motor that links the drive shafts 148, 150 with additional power transmission apparatus.

A set of a drive motor (e.g., front drive motor 152), a wheel (e.g., one of the drive wheels 110), and an encoder (e.g., an encoder on the front drive motor 152 or front drive shaft 148) may collectively be referred to as a drive set. In some embodiments, a drive set may also include a rotating element, such as, for example, a drive shaft.

Two battery enclosures 162 may enclose batteries for providing power for the motors 152, 154, 158, 160. Control electronics 165 within the lifting cart 100 may be powered by batteries in the battery enclosures 162 and may manage control over driving the motors 152, 154, 158, 160 in response to control signals received via the transceiver antennae 118, sensors (e.g., proximity sensors 144, internal encoder 164, and photo sensor 140), or preprogrammed instructions. In some arrangements the control electronics 165 may also perform calculations and computations, such as, for example, converting the measurements of the internal encoder 164 into a rotation count of the encoder wheel 112 or determining a distance traveled by the lifting cart 100 based on the rotation count. A contactor assembly 166 may be included in the base enclosure 104 as a connection point for recharging batteries in the enclosures 162. The contactor assembly 166 may extend through the underside of the base enclosure 104 to contact charging terminals below the lifting cart 100, such as, for example, on a top surface of an aisle cart or another charging station.

Figure 2A:
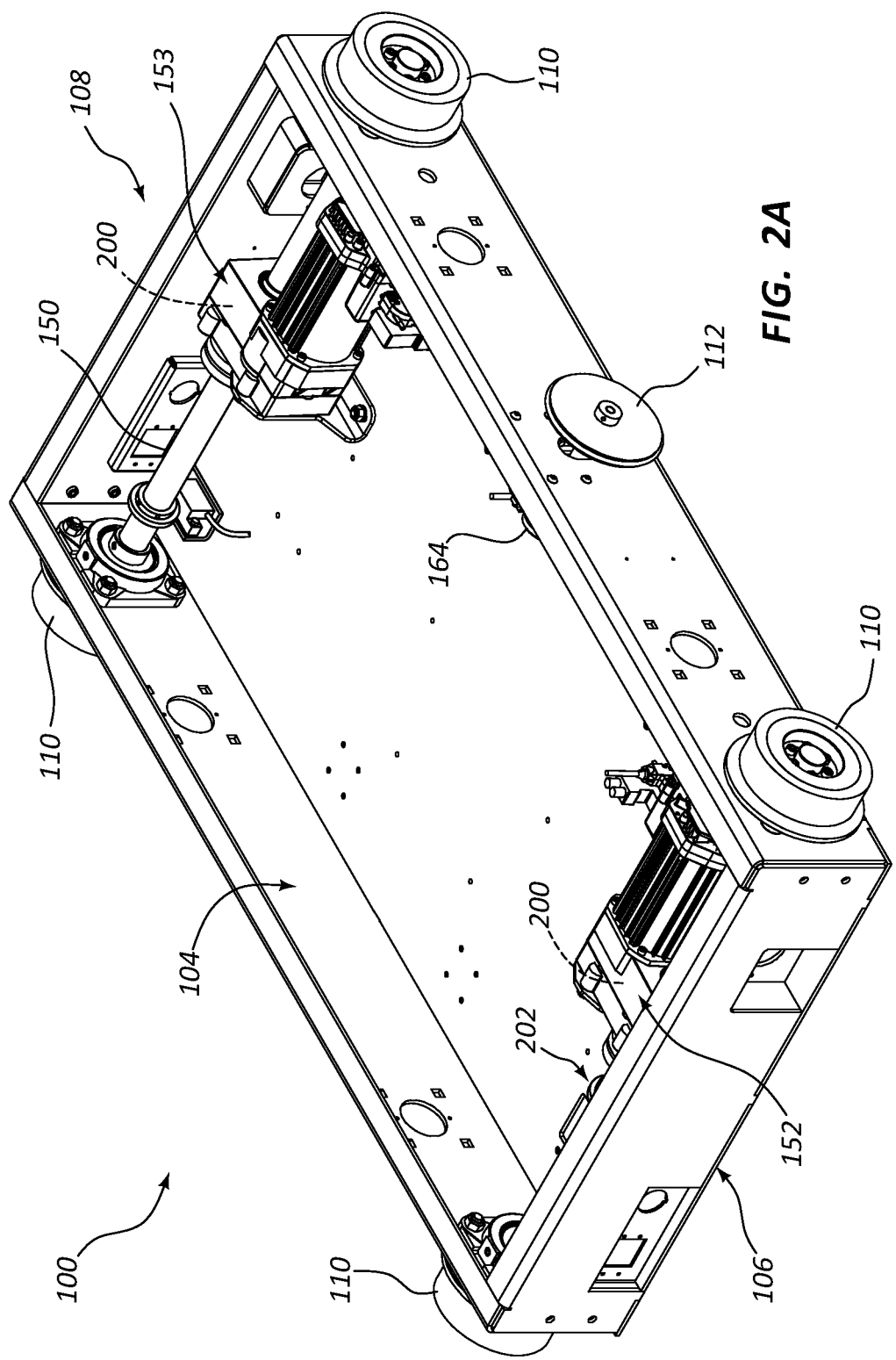
FIG. 2A is an orthographic view of the front-left side of a simplified view of a lifting cart in accordance with an exemplary embodiment of the present disclosure.
Figure 2B:
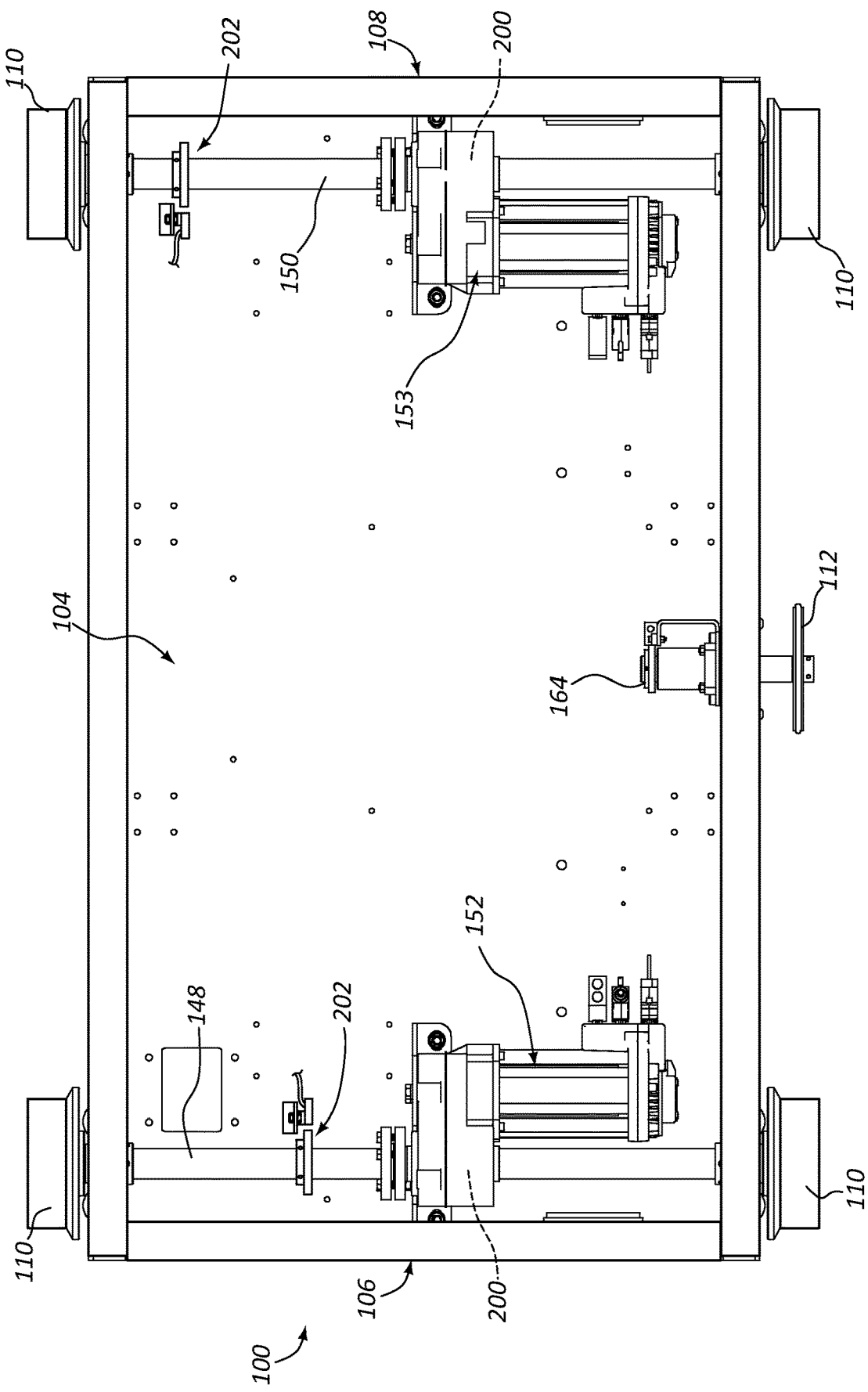
FIG. 2B is a top view of the lifting cart of FIG. 2A.
Figure 2C:
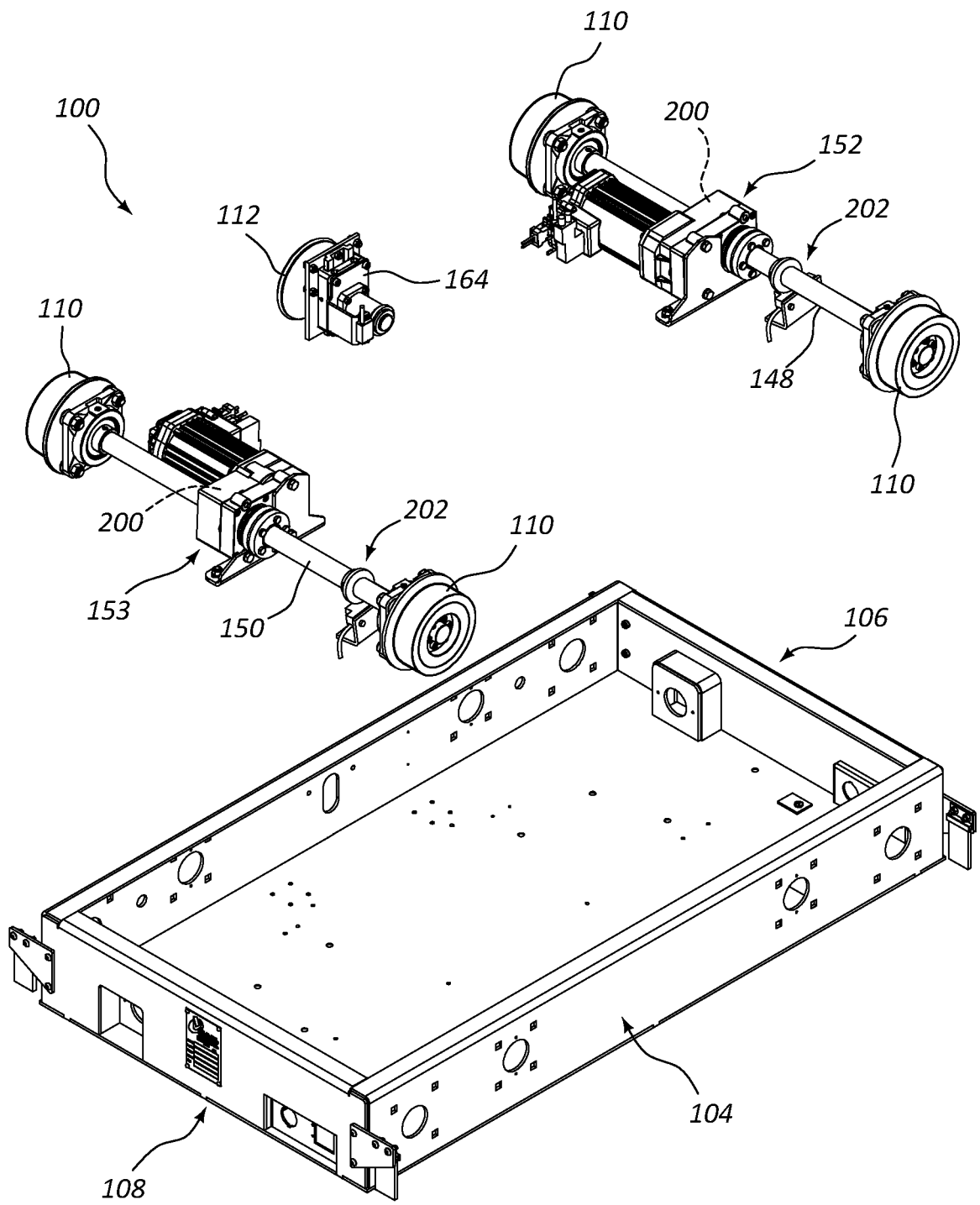
FIG. 2C is an exploded rear-right orthographic view of the lifting cart of FIG. 2A.

FIGS. 2A-2C show simplified views of the lifting cart 100 where drive and encoder components are isolated in the assembly, including the base enclosure 104, drive wheels 110, encoder wheel 112, drive shafts 148, 150, drive motors 152, 153, and internal encoder 164. FIG. 2A is an orthographic view of the front-left side of the cart 100, FIG. 2B is a top view, and FIG. 2C is an exploded rear-right orthographic view. FIGS. 2A-2C clearly show the hollow bore configuration of the drive motors 152, 153 and the independent rotation and encoding of the encoder wheel 112. FIGS. 2A-2C also show that the front drive wheels 110 have synchronized rotation driven by the front drive motor 152 alone, and that the rear drive wheels 110 have the same feature due to the rear drive motor 153 driving them independent from the front drive wheels 110.

The front and rear drive motors 152, 153 may each have an absolute encoder 200 built as part of the motors 152, 153. These absolute encoders 200 may be used to track the movement of the motors 152, 153 and/or drive shafts 148, 150 as they propel the cart 100 about a railway. The absolute encoders 200 may also act as part of a system where a controller of the cart 100 tracks the movement of the front and rear drive sets in the cart 100 and, upon comparing the output of the absolute encoders 200, synchronizes the speed and rotation of the drive wheels 110. In some embodiments, the feedback of the drive shafts 148, 150 coming from the absolute encoders 200 allows the controller to manage commands and signals sent to the drive motors 152, 153, such as by increasing the speed of a lagging motor to decrease friction caused by certain drive wheels 110 moving more slowly than others. The absolute encoders 200 may also allow the controller to track the number of rotations experienced by the drive shafts 148, 150 and therefore at least approximate the distance traveled by the cart 100 in the railway.

In some embodiments, external incremental encoders 202 are attached to a drive shaft 148, 150 or other element in a drive set. These incremental encoders 202 may serve the function of the absolute encoders 200, but may also or alternatively be positioned external to the motor to directly measure rotation of other elements (e.g., a drive wheel 110).

Figure 3A:
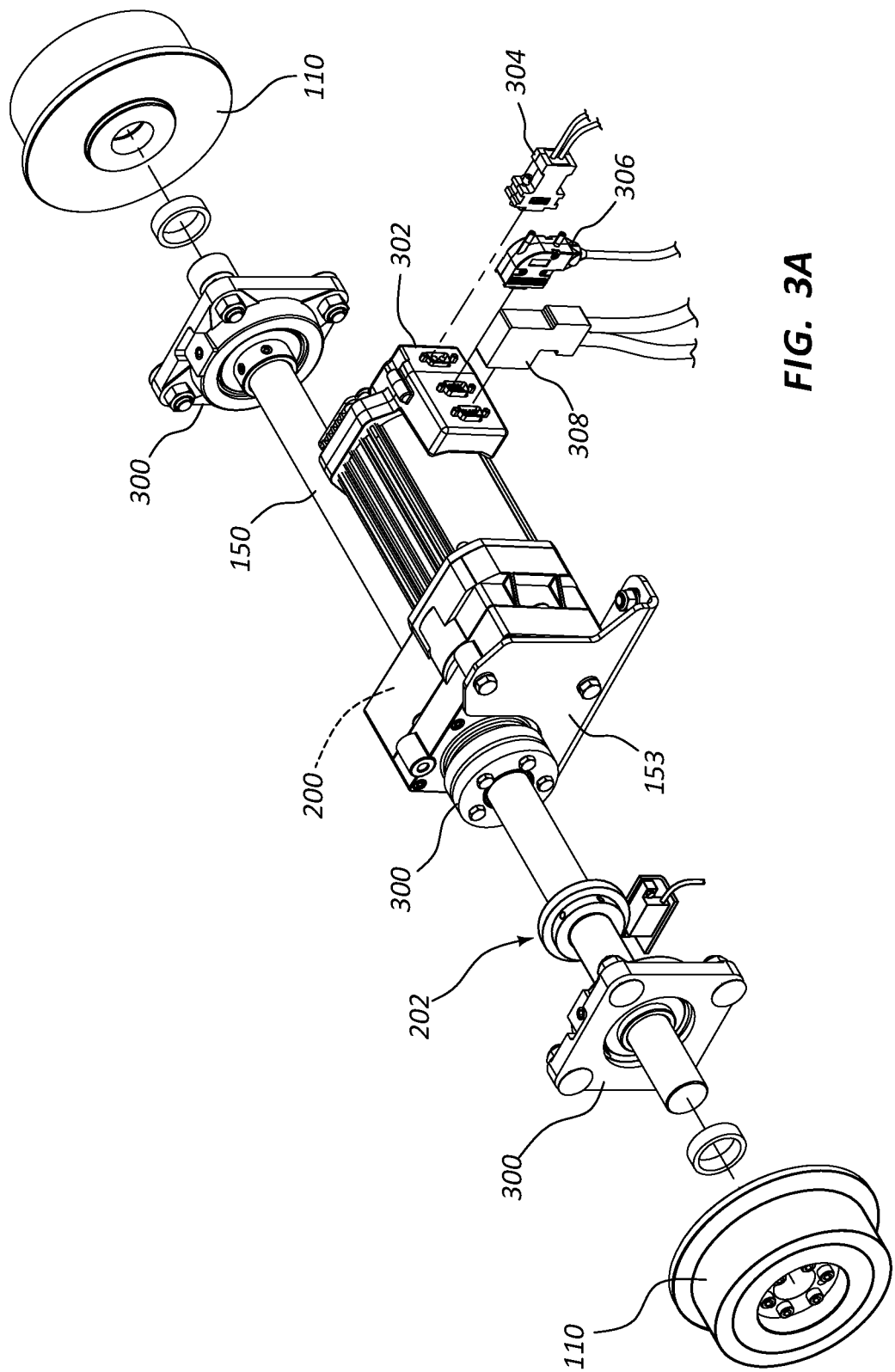
FIG. 3A is an exploded orthographic view of a rear drive assembly according to an embodiment of the present disclosure.
Figure 3B:
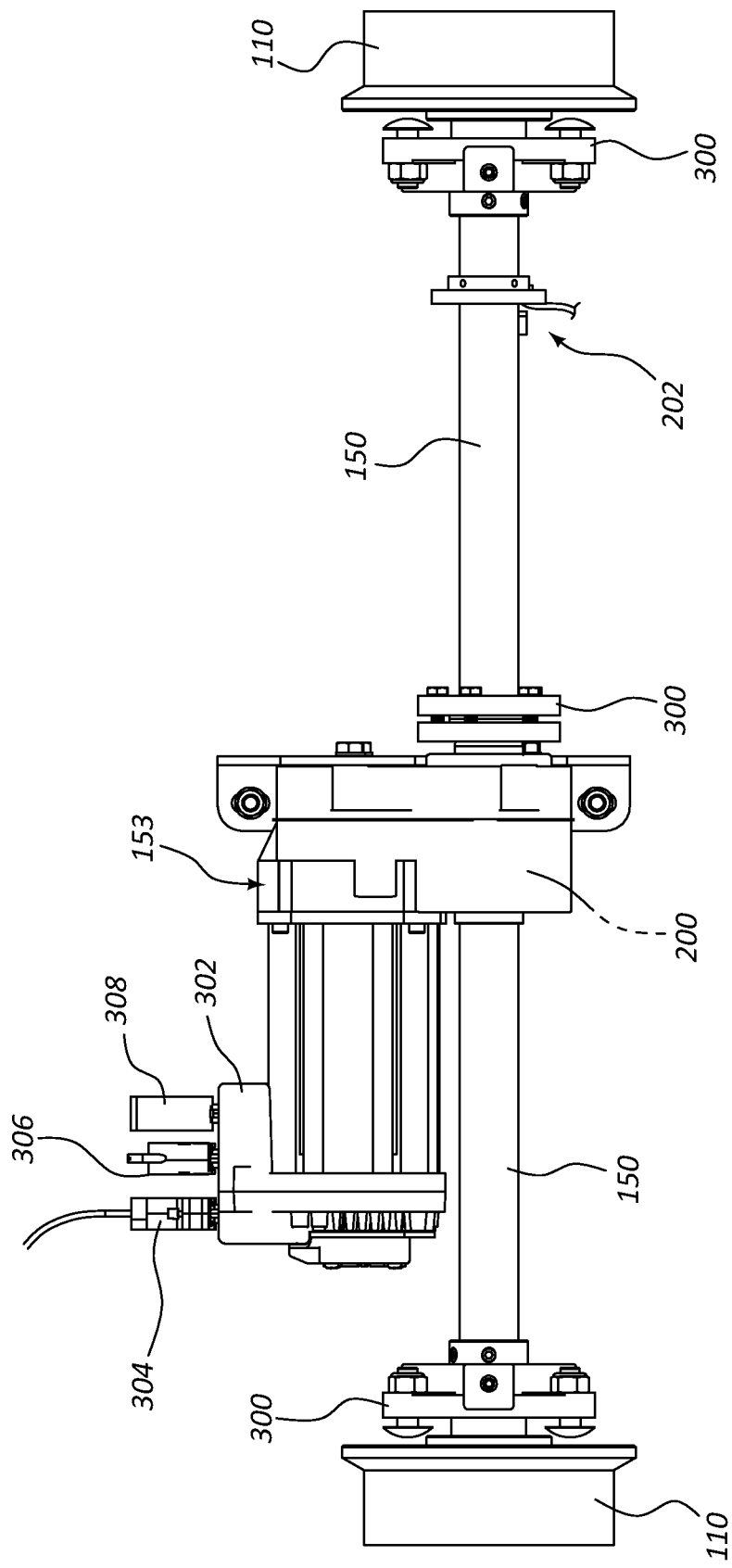
FIG. 3B is a top view of the assembly of FIG. 3A.

FIG. 3A is an exploded orthographic view of a rear drive assembly that may be installed in some embodiments of a lifting cart 100 according to the present disclosure. FIG. 3B is a top view of assembled components of FIG. 3A. The rear drive motor 153 may be connected to the drive wheels 110 by the rear drive shaft 150. The drive shaft 150 may be secured within bearings 300. The rear drive motor 153 may have a power and control interface 302 to which multiple connections may be attached. For example, the power and control interface 302 may receive a motor power line 304, a motor signal line 306, and a controller area network (CAN) connection 308. The rear drive motor 153 may therefore receive power and send and receive signals to other elements of the lifting cart 100 and surrounding systems. For example, these connections may be used to control the speed of the motor 153. In some embodiments, the rear drive motor 153 may have an integrated encoder, such as an absolute encoder 200, and the output of the encoder may be output via the power and control interface 302. In other embodiments, an external incremental encoder 202 may be configured to obtain a property of rotation of the drive motor 153, drive shaft 150, or drive wheels 110 through a connection outside the power and control interface 302 of the drive motor 153.

While reference in FIGS. 3A and 3B has been made to the rear drive motor 153 and related components, like features and elements may be found in the front drive motor 152 and its related components, as will be understood by those having skill in the art.

Figure 4A:
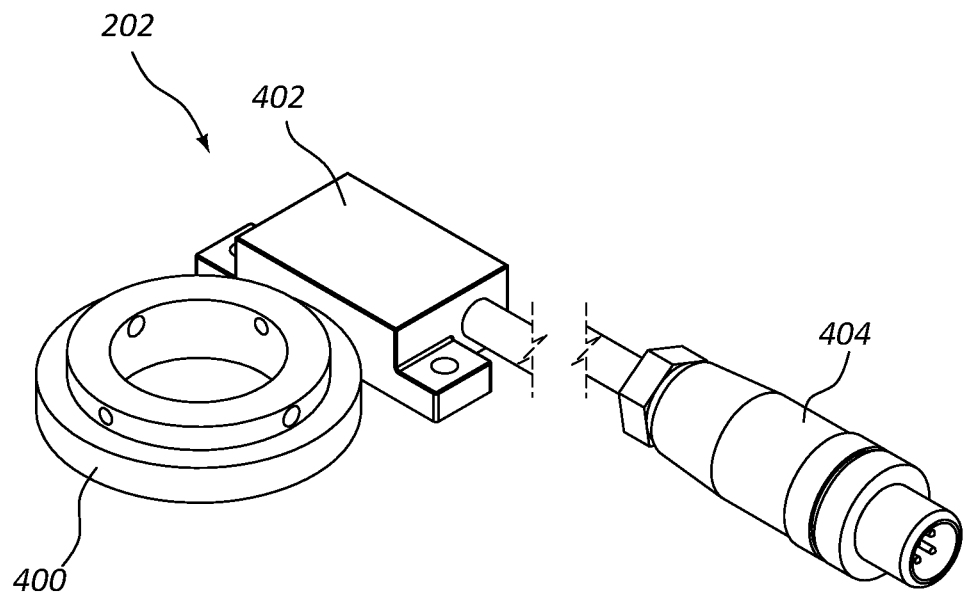
FIG. 4A is an orthographic view of an incremental encoder according to an exemplary embodiment of the present disclosure.
Figure 4B:
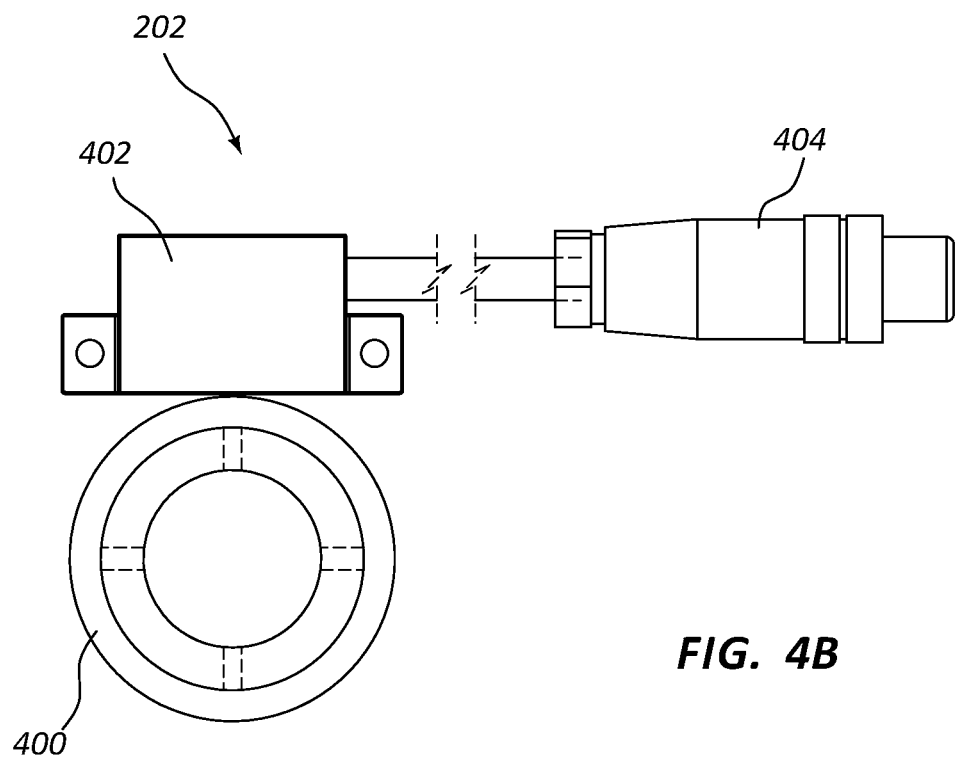
FIG. 4B is a side view of the incremental encoder of FIG. 4A.
Figure 5:
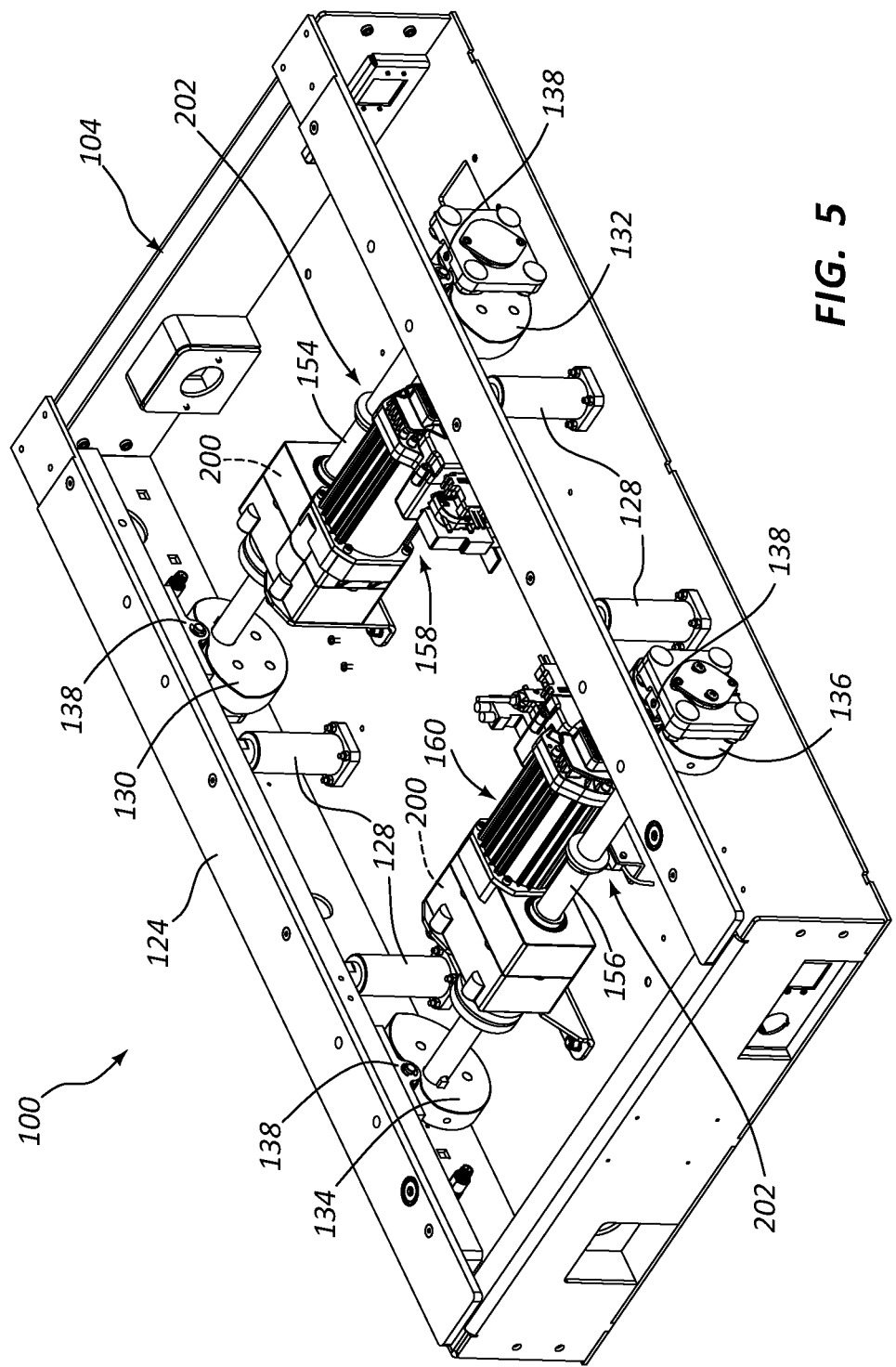
FIG. 5 is a simplified orthographic view of various lifting assemblies of a lifting cart in accordance with an exemplary embodiment of the present disclosure.

An incremental encoder 202 is shown in greater detail in FIGS. 4A and 4B. FIG. 4A is an orthographic view, and FIG. 4B is a side view. The incremental encoder 400 may comprise an encoder disc 400 and an encoder sensor 402. The encoder disc 400 may be secured to the drive shaft 148, 150 (e.g., as shown in at least FIGS. 2A-3B), the cam shaft 154, 156 (e.g., as shown in FIGS. 5 and 7A-7B), motor 152, 153 output, or a related component and rotates with the component to which it is connected. The encoder sensor 402 senses the rotation of the encoder disc 400 and outputs a signal of the readings to an output connector 404 that is linked to the electronic components (e.g., control electronics 165) of the lifting cart 100. In some embodiments, the incremental encoder 202 may use a magnetic encoder sensor 402 to detect and count rotations of a drive shaft 148, 150.

FIG. 5 shows a simplified view of the lifting cart 100 where lifting assembly components are isolated in the base enclosure 104, including the front and rear cam motors 158, 160, front and rear cam shafts 154, 156, front cams 130, 132, rear cams 134, 136, cam followers 138, support surfaces 124, and stabilizer bearings 128. A sidewall of the base enclosure 104 has been removed to show parts positioned within. The cams 130, 132, 134, 136 are shown here spread out and forming corner points of a rectangular shape beneath the support surfaces 124 and cam followers 138. This spread-apart configuration may allow the support surfaces 124 and lid 102 to be stable under heavy loads and loads that may be off-balanced or off-center on top of the lid 102. Thus, a load placed thereon may be less likely to wobble, twist, teeter, or otherwise move out of the position at which it is originally placed on the cart 100. As a result, the cart 100 may carry its loads securely and avoid damage to the loads or surrounding equipment or railways.

The orientation of the front cams 130, 132 opposes the orientation of the rear cams 134, 136, as shown by the larger asymmetrical portions of the cams 130, 132, 134, 136 facing toward each other. Thus, in some embodiments, the front cams 130, 132 are rotated in one direction (e.g., counter-clockwise) and the rear cams 134, 136 are rotated in the opposite direction (e.g., clockwise).

When the rotation of the cams 130, 132, 134, 136 is synchronized, the movement of some cams may be in the opposite direction from the movement of other cams. For example, a one-degree counter-clockwise rotation of the front cams 130, 132 may be synchronized with a one-degree clockwise rotation of the rear cams 134, 136. This configuration may be beneficial in reducing the amount of lateral stresses experienced by the support surfaces 124, lid 102, and stabilizer bearings 128. The shear stresses from each pair of cams 130, 132, 134, 136 counteract each other as they rotate in opposition. This may help prevent the stabilizer bearings 128 from binding. In other embodiments, such as, for example, configurations where the cams 130, 132, 134, 136 move slowly, the cams 130, 132, 134, 136 may be oriented in, and rotate in, the same direction.

This view also clearly shows the four stabilizer bearings 128. The stabilizer bearings 128 may further stabilize the support surface 124, lid 102, and any load on top of the cart 100 by resisting lateral motion of the cart. The stabilizer bearings 128 may however facilitate relative vertical motion between the base enclosure 104 and support surfaces 124 through at least the range of motion provided by rotation of the cams 130, 132, 134, 136. In some arrangements, the stabilizer bearings 128 may additionally dampen the motion of the support surfaces 124 as they are lifted and lowered by the cams 130, 132, 134, 136.

The two cam motors 158, 160 drive the cam shafts 154, 156 to rotate the cams 130, 132, 134, 136. The cam motors 158, 160 may be hollow-bore gear motors, as shown in the figures. Hollow-bore motors may beneficially provide power simultaneously to one cam shaft and two cams without needing additional drive transmission means. Thus, hollow-bore motors may reduce cost and weight of the cart 100, may save space in the enclosure 104, and may improve output efficiency and energy efficiency of the motors 158, 160. A computing module or controller connects to the cam motors 158, 160 to control their rate of rotation and position of the cam shafts 154, 156 when a load is lifted or lowered on the support surfaces 124 and/or lid 102. The cam motors 158, 160 may be beneficially placed peripherally within the base enclosure 104 (i.e., towards the front and rear ends 106, 108 of the base enclosure 104) to spread apart the cams 130, 132, 134, 136 toward the ends of the support surfaces 124, thereby distributing the weight-bearing portions of the cart 100 and improving the stability of the loaded support surfaces 124 and lid 102.

Figure 6A:
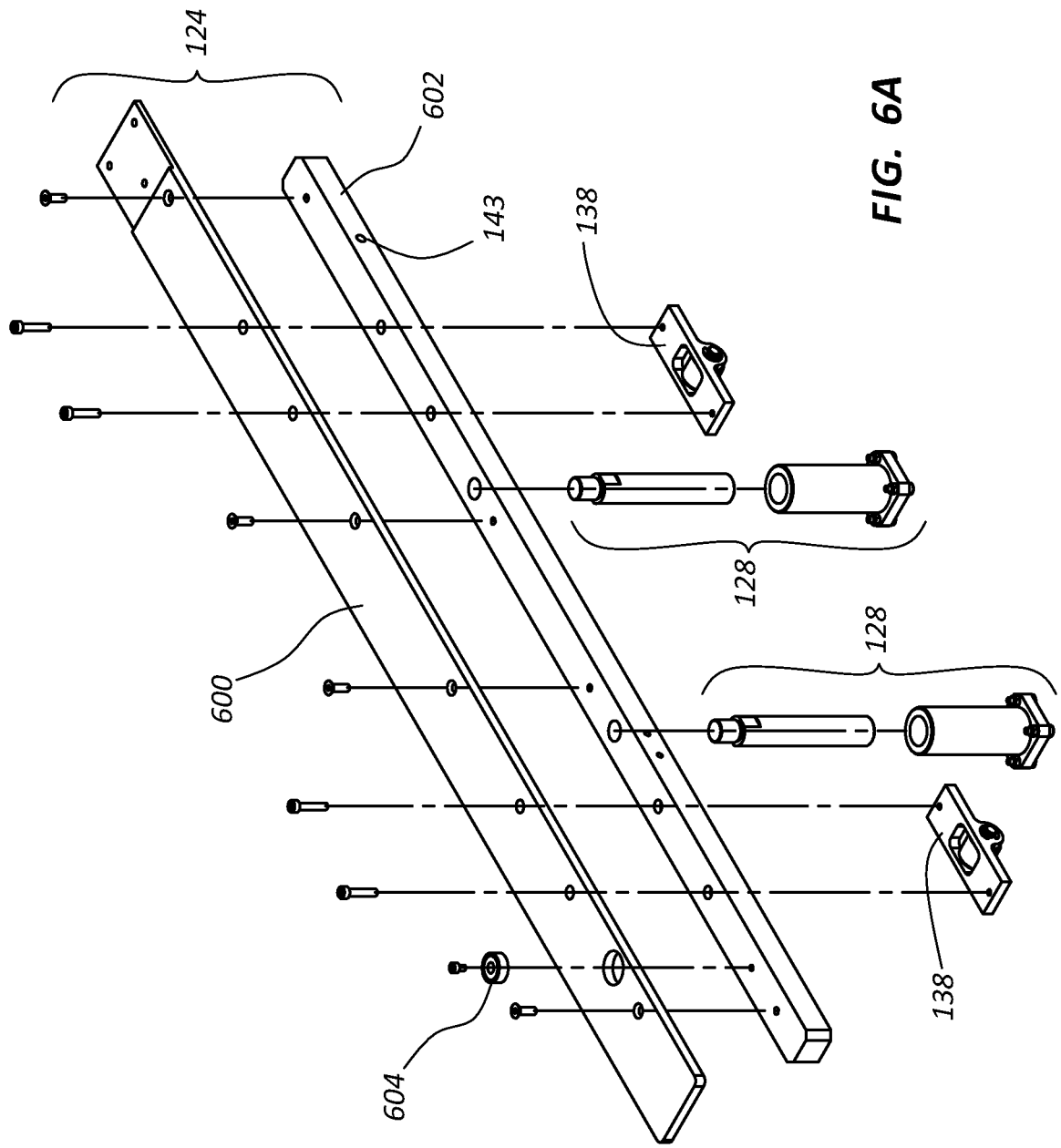
FIG. 6A is an exploded orthographic view of a support assembly of an exemplary embodiment of the present disclosure.
Figure 6B:
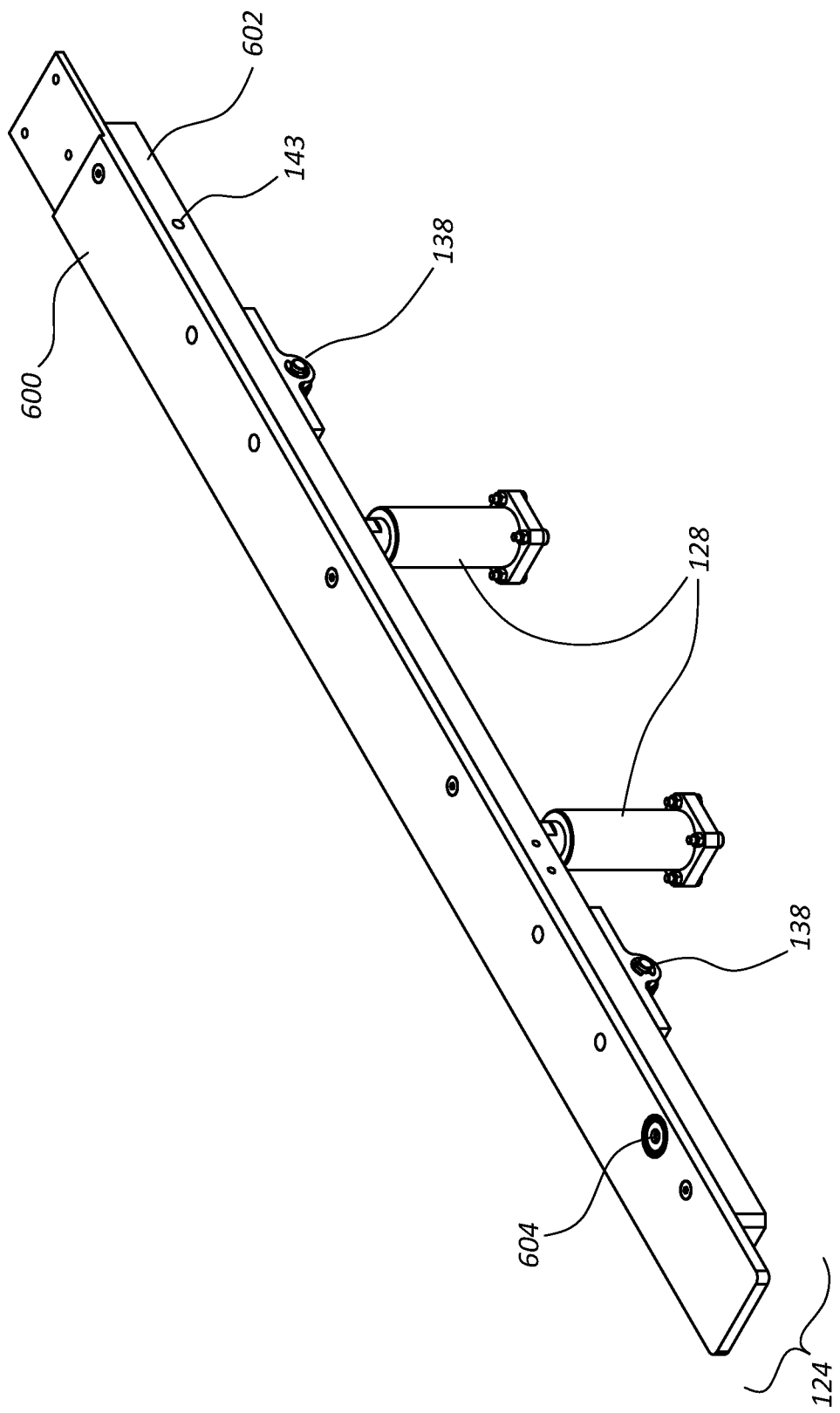
FIG. 6B is an assembled orthographic view of the support assembly of FIG. 6A.

FIGS. 6A-6B are views of a support surface 124, cam followers 138, and stabilizer bearings 128. FIG. 6A is an exploded orthographic view, and FIG. 6B is an assembled orthographic view. These figures show a support surface 124 that would be on the left side of the cart 100. A similar, mirrored version may be positioned on the right side, as shown in FIG. 5. The support surface 124 comprises a generally flat contact bar 600 and an underlying support bar 602. The support bar 602 may improve the rigidity of the support surface 124 and provide a location for attaching the stabilizer bearings 128 and cam followers 138. In some embodiments, the side of the support bar 602 may be connected to the gas spring 142 (e.g., at the inner surface connection point 143, as shown in FIG. 1F), the position member 146 (see FIGS. 10A-10B), or a lid proximity sensor 1100 (see FIG. 11). The contact bar 600 may improve the stability of the support surface 124 and reduce stresses in the lid 102 by distributing the load across a broader surface area than the surface of the support bar 602. The contact bar 600 may also bear the hinge 126 connecting the lid 102 to the cart 100. In some embodiments, a magnet 604 may be positioned near the rear end of the contact bar 600. The magnet 604 may magnetically bias the lid 102 to remain in contact with the contact bar 600.

FIG. 7A is an exploded orthographic view of a front cam drive assembly 700. FIG. 7B is an assembled top view of the cam drive assembly of FIG. 7A. The front cam motor 158 may be a hollow-bore gear motor configured to drive the cam shaft 154. The cam shaft 154 may be held in place as it rotates by bearings 702 and its interface with the front cam motor 158. The cams 130, 132 may be attached near the ends of the cam shaft 154 so as to be underneath the support surfaces 124. A cam sensor 704 may be located near an end of the cam shaft 154. The cam sensor 704 is discussed in more detail in connection with FIG. 9.

The cam motor 158 may have a power and control interface 706 to which multiple connections may be attached. For example, the power and control interface 706 may receive a motor power line 708, a motor signal line 710, and a controller area network (CAN) connection 712. The front cam motor 158 may therefore receive power and send and receive signals to other elements of the lifting cart 100 and surrounding systems. For example, these connections may be used to control the speed of the motor 158. In some embodiments, the front cam motor 158 may have an integrated encoder, such as an absolute encoder 200, and the output of the encoder may be output via the power and control interface 706. In other embodiments, an external incremental encoder 202 may be configured to obtain a property of rotation of the cam motor 158 or cam shaft 154 through a connection outside the power and control interface 706 of the cam motor 158.

While reference in FIGS. 7A-7B has been made to the front cam motor 158 and related components, like features and elements may be found in the rear cam motor 160 and its related components, as will be understood by those skilled in the art.

Figure 8C:
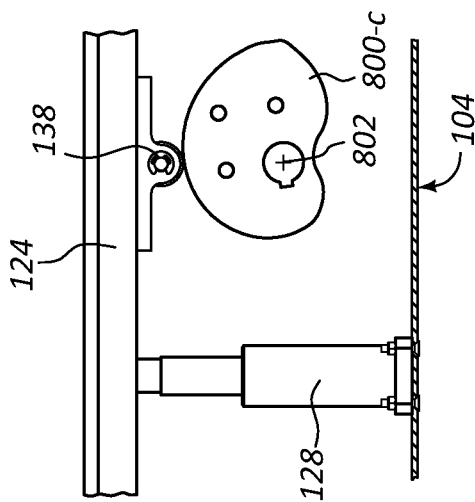
FIG. 8C is side view of the lifting assembly of FIG. 8B with the cam further rotated counter-clockwise.
Figure 8B:
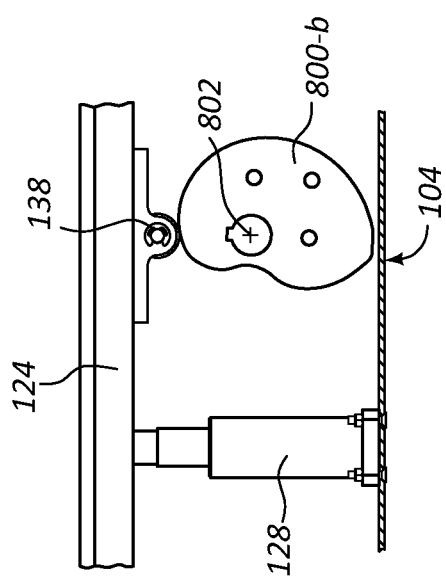
FIG. 8B is a side view of the lifting assembly of FIG. 8A with the cam rotated counter-clockwise.
Figure 8A:
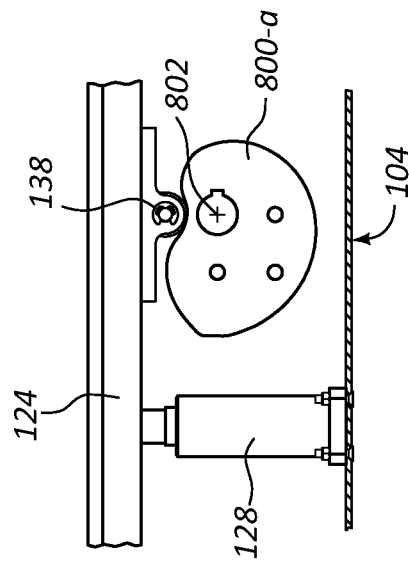
FIG. 8A is a side view of a lifting assembly of a lifting cart in accordance with an exemplary embodiment of the present disclosure.
Figure 8E:
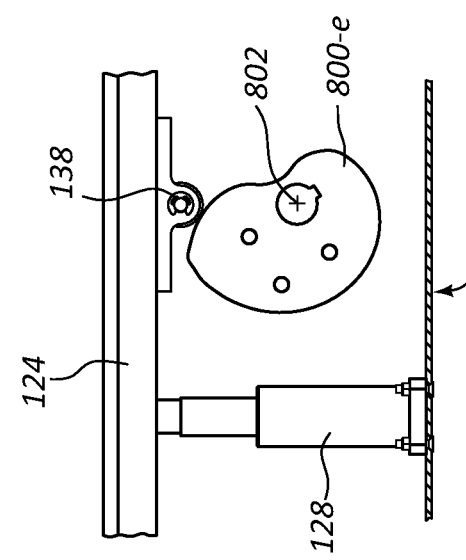
FIG. 8E is a side view of the lifting assembly of FIG. 8D with the cam further rotated counter-clockwise.
Figure 8D:
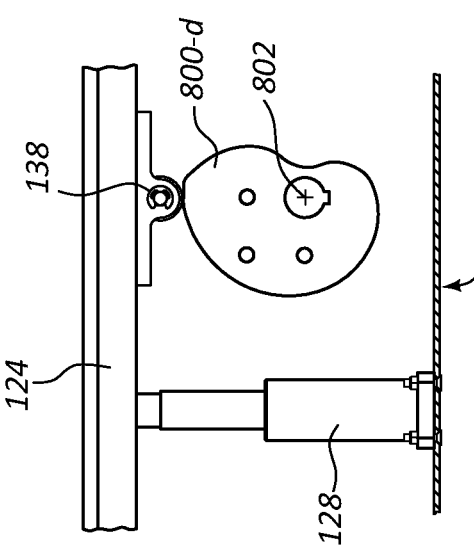
FIG. 8D is a side view of the lifting assembly of FIG. 8C with the cam further rotated counter-clockwise.

FIGS. 8A-8E show a detailed side view of a lifting assembly including a support surface 124, cam follower 138, stabilizer bearing 128, and cam 800 as it rotates through one complete revolution. The cam follower 138 may contact the cam 800 along an axis extending through the center of rotation 802 of the cam 800. The stabilizer bearing 128 may restrict the support surface 124 as it translates vertically upward and downward in relation to the center of rotation 802. In FIG. 8A, the cam follower 138 is at the lowest position on the cam 800-*a*. This position typically corresponds with a condition of the cart 100 being unloaded and the lid 102 being at its lowest position relative to the base enclosure 104. This is also typically the position of the cam 800-*a* while the cart is unloaded and moving, such as, for example, while being moved by the aisle cart to a load or while moving from an aisle cart to a pick up a load. Upon reaching a designated lifting point, the cam 800-*a* may rotate and thereby progress to the position of cam 800-*b* in FIG. 8B in response to rotation of the cam shaft bearing the cam 800-*a*, 800-*b*.

As shown in FIG. 8B, the cam 800-*b* has rotated approximately ninety degrees counter-clockwise. The cam follower 138 is now farther from the center of rotation 802 and the support surface 124 and stabilizer bearing 128 have been accordingly lifted. This progression of lifting the cam follower 138, support surface 124, and stabilizer bearing 128 is illustrated as the cam 800-*b* rotates counterclockwise through FIGS. 8C and 8D, as shown by cams 800-*c* and 800-*d*.

Between the positions of cam 800-*a* and cam 800-*b*, the rate at which the cam follower 138 moves upward per degree of rotation is greater than the rate at which the cam follower 138 moves upward per degree of rotation between the positions of cam 800-*b* and 800-*d*. Thus, the portion of the cam profile traversed between the position of cam 800-*a* and cam 800-*b* may be referred to as a movement profile portion. In some embodiments, this cam portion is used when the cam 800 is used to lift the support surface 124 between its lowest position and a position to where the support surface 124 (or lid 102) first at least nearly comes into contact with the bottom of the load to be lifted. This portion of the lift of the support surface 124 may be referred to as the unloaded portion of the lift because there is no load on the upper surface of the cart 100. While rotating through the movement profile portion, the upper surface of the cart 100 has relatively high rate of motion per degree of rotation of the cam 800. This may improve the rate at which the cart 100 may lift a load.

The portion of the cam profile extending between the positions of cams 800-*b* and 800-*d* may be referred to as the load profile portion. The rate of movement of the upper surface of the cart 100 may be slower per degree of rotation of the cam 800 while the cam follower 138 traverses the load profile portion of the cam 800. In some embodiments, the upper surface of the cart 100 may come into contact with the load when the cam 800 is in the position of cam 800-*b*, and the load is lifted relatively slowly through the position of cam 800-*c* and onward until reaching the maximum lifted height at the position of cam 800-*d*. The cam profile where the cam follower 138 contacts cam 800-*d* may be flatter than at other nearby cam profile portions (or entirely flat) to provide extra stability while the load is held in its fully lifted position. If the cart loses power or shuts down in this position, the load typically would be stable and would not fall off this portion of the cam 800-*d*. By moving more slowly per degree of rotation of the cam 800 between the positions shown in FIGS. 8B and 8D, the cam motor driving the cam 800 may have increased mechanical advantage, thereby reducing the torque specifications for the motor that would otherwise be required if the cam profile raised the support surface 124 at a steady, faster rate.

When a destination is reached and the cart 100 must lower the load onto a railway or other nearby structure, the cam 800 rotates from the position of cam 800-*d* to the position of cam 800-*c* (shown in FIG. 8C) and then continue back to the position of cam 800-*a*. This may ease the load down gradually and gently. If the cart is not loaded while in the position of cam 800-*d*, the cam may be directed to continue to rotate through the position of cam 800-*e* (shown in FIG. 8E). Again, the cam follower 138 on the cam profile may move more slowly while loaded between cam 800-*d* and cam 800-*e* and then more quickly after unloaded between cam 800-*e* and cam 800-*a*. In some embodiments, the rate at which the cam 800 lowers the load from cam 800-*d* and returns to the position of cam 800-*a* may be greater than the rate of lifting the load between cam 800-*a* and 800-*d* since the potential energy of the load may assist the cam motor.

Thus, the cam 800 may be generally shaped as an asymmetrical bean or may have movement and load profile portions generally forming an outward spiral, as shown in FIGS. 8A-8E. By combining the movement profile portion with the load profile portion on the cam 800, the cart 100 may simultaneously use a lower-torque cam motor and reduce the overall time required to lift the load. The load may be moved more slowly and securely as the cart 100 is in contact with it, and then the cart 100 may move away from the load more quickly when slow movement is not necessary.

In some arrangements, the distance between the bottom of the loads lifted and the top of the cart 100 may be constant. In such cases, the cam profiles may be designed such that the movement profile portion raises the upper surface of the cart 100 until the upper surface of the cart 100 reaches the anticipated position of the underside of the loads. In other embodiments, loads may sag in place or have inconsistent positions relative to the upper surfaces of the cart 100. In these cases, the cam profile may be designed with a reduced movement profile portion and a greater load profile portion. A reduced movement profile portion then may cause the upper surfaces of the cart 100 to move quickly over a smaller distance and not then unintentionally attempt to move quickly while in contact with a sagging load or a load that is otherwise lower than expected. Furthermore, the movement profile portion may raise the upper surface of the cart 100 to a point intentionally near to the underside of the load without contacting it. At that point, the load profile portion may close the rest of the gap between the cart 100 and the load. This configuration may preserve motor life by reducing the chance that a load will come into contact with the cart 100 before the cam followers reach the load profile portions on the cams.

While reference has been made in FIGS. 8A-8E to a single cam 800, the principles and features of the cam 800 may be applied to each of the cams in the cart 100 (e.g., cams 130, 132, 134, 136). Some cams may have a reversed orientation from cam 800. In some embodiments, reversed cams may be driven to rotate through their movement profile portions at the same time that the non-reversed cams are driven through their movement profile portions. Similarly, the load profile portions of all of the cams may be traversed simultaneously. By doing so, the load may remain balanced on the cart 100.

FIG. 9 is an orthographic view of a cam sensor 900. The cam sensor 900 may detect the angular position of a cam 130, 132, 134, 136 or cam shaft 154, 156 as they turn within the base enclosure 104. The cam sensor 900 may comprise an optical sensor, a proximity sensor, a magnetic sensor, or the like to track the position of the rotating elements in the cam drive assembly. In some embodiments, the cam sensor 900 may act as an encoder for the cam shaft 154 or 156. The cam sensor 900 may be connected to the control electronics 165 of the cart 100 and may be used to determine the position of the cams 130, 132, 134, 136. A computing module or controller of the cart 100 may receive the output of cam sensors 900 in the cart 100 and use shaft position feedback to control the cam motors 158, 160 and thereby synchronize the angular motion of the cams 130, 132, 134, 136. The cam sensor 900 may be identical to the cam sensor 704 of FIGS. 7A-7B.

In some embodiments, the cam sensor 900 may be used to periodically calibrate the position of a cam shaft 154, 156. The ends of the cam shafts 154, 156 may have embedded magnets, and the cam sensor 900 may detect the orientation of the embedded magnets to determine the rotational position of the shaft to which it is near.

FIG. 10A shows a close-up of a simplified orthographic view of a pair of proximity sensors 144 and a position member 146. Cam 134, rear cam shaft 156, and rear cam motor 160 are not shown. FIG. 10B is a side view of the proximity sensors 144 and position member 146 of FIG. 10A. The proximity sensors 144 are attached to the base enclosure 104 and are configured to detect the position of a position member 146 attached to the side of a support surface 124 that moves along with the support surface 124.

Multiple proximity sensors 144 may be implemented in order to improve the accuracy of measuring the position of the support surfaces 124. When the lid 102 and support surfaces 124 are in a lowered position, the position member 146 is detected as being near the bottom proximity sensor 144, and when the lid 102 and support surfaces 124 are raised, the position member 146 is moved to align with the upper proximity sensor 144. The dual proximity sensors 144 verify the raised or lowered position of the support surfaces 124. In some embodiments, the lower proximity sensor may confirm whether the position member 146, and therefore the support surfaces 124 are properly in their lowered position. The upper proximity sensor may confirm whether the position member 146 and support surface 124 are in the raised position. If only one proximity sensor 144 were used, the controller may not be able to definitively confirm whether the support surfaces 124 are in their maximum highest or lowest positions, and problems can arise if there is a jam in the system that goes unnoticed.

In another embodiment, a keeper plate may be attached to the underside of the support surfaces 124 near the cams 130, 132, 134, 136. A keeper plate may be an element wrapping around the underside of a cam such that when the cam moves downward, even if the support surface 124 or lid 102 is stuck in place in a raised position, the cam will still be able to pull down on the support surface 124 and thereby bring it to a lowered position. A keeper plate may be included in embodiments having proximity sensors 144 or may be implemented as an alternative to using proximity sensors 144.

Figure 11B:
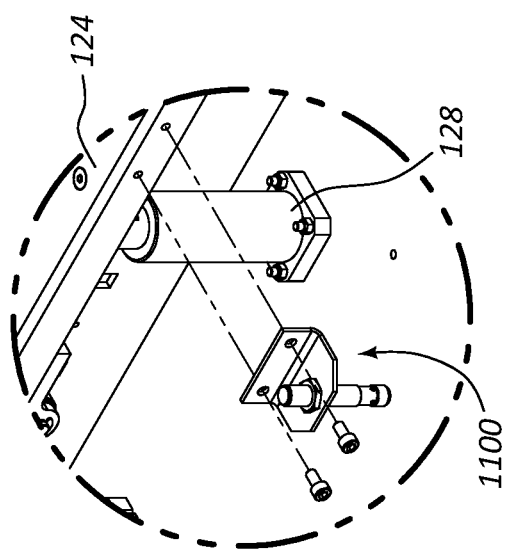
FIG. 11B shows a detailed view of FIG. 11A.
Figure 11A:
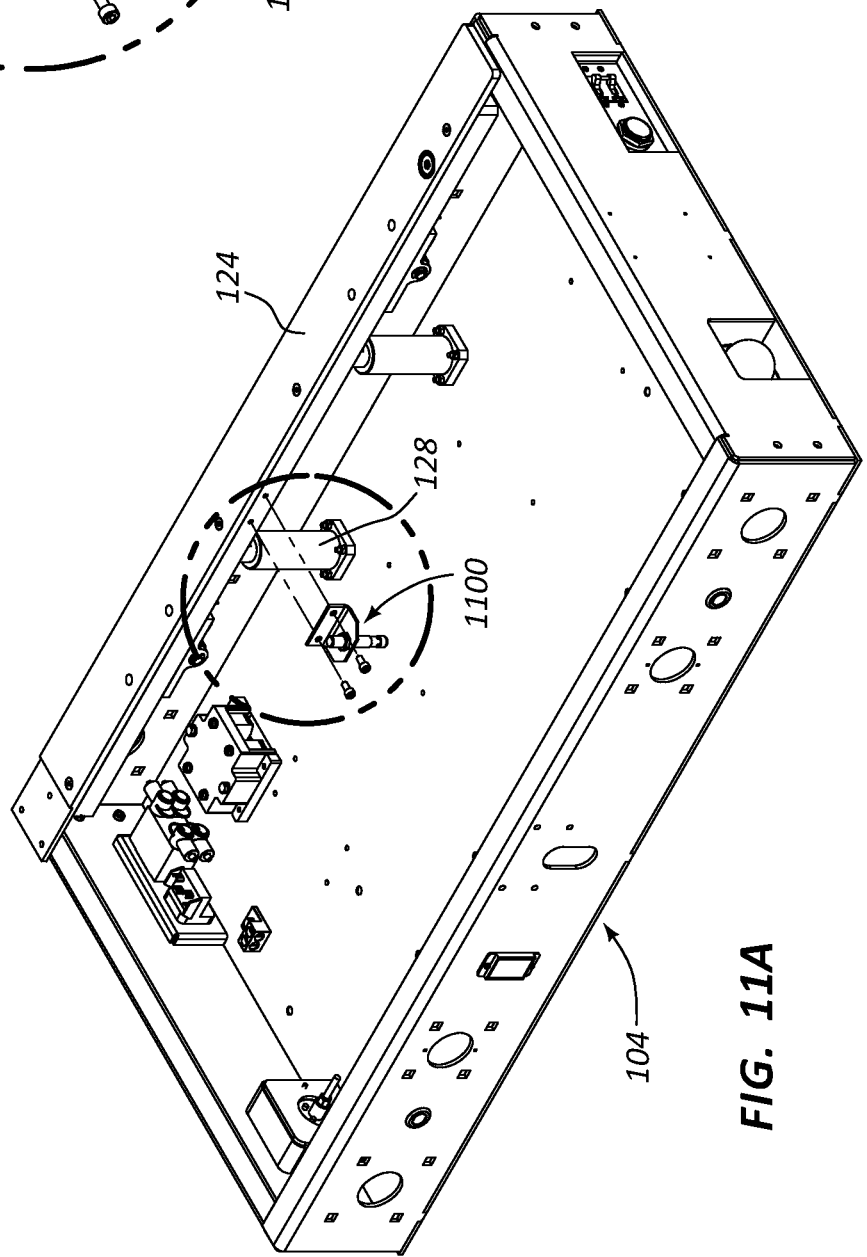
FIG. 11A is an orthographic view of a lid proximity sensor of a lifting cart in a base enclosure of an exemplary embodiment of a lifting cart.

FIGS. 11A and 11B show a simplified orthographic view of the interior of the base enclosure 104 where a lid proximity sensor 1100 is attached to the side of one of the support surfaces 124. The lid proximity sensor 1100 may sense the position of the lid 102 relative to the support surface 124 to which it is attached. For example, the lid proximity sensor 1100 may comprise a photo sensor that is darkened by the presence of the lid 102, a piezoelectric sensor which the lid 102 touches while closed, infrared sensor, load cell, acoustic sensor, or another similar sensing device. By using the lid proximity sensor 1100, a controller may control the cart 100 based on whether the lid 102 is closed and resting horizontally on the support surfaces 124 or not. For example, the lid proximity sensor 1100 may detect if the lid 102 opens during movement of the cart 100 and the cart 100 may be directed to slow down. Alternatively, the lid proximity sensor 1100 may detect that the lid is open 102 and the controller may therefore prevent the drive motors 152, 153 from moving the cart 100 so that maintenance can be more safely performed.

Figure 12A:
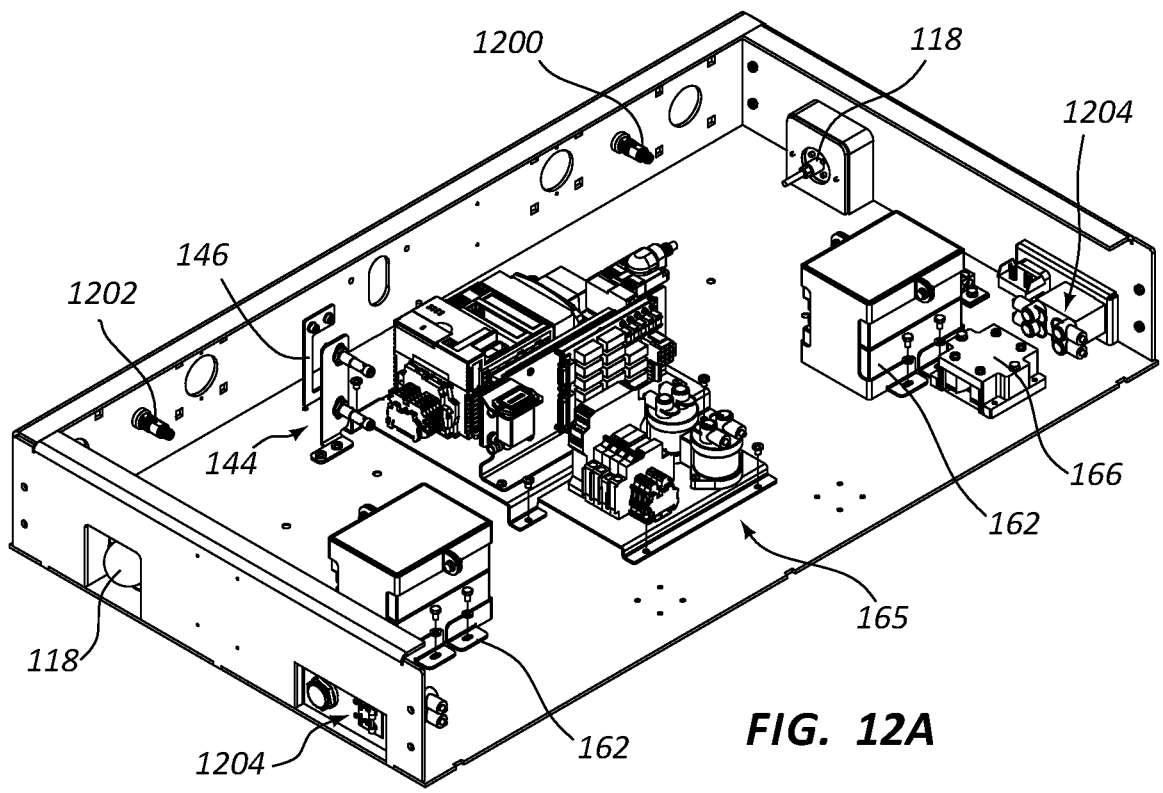
FIG. 12A is a simplified orthographic view of an exemplary embodiment of a lifting cart where various electronic components are isolated in a base enclosure.
Figure 12B:
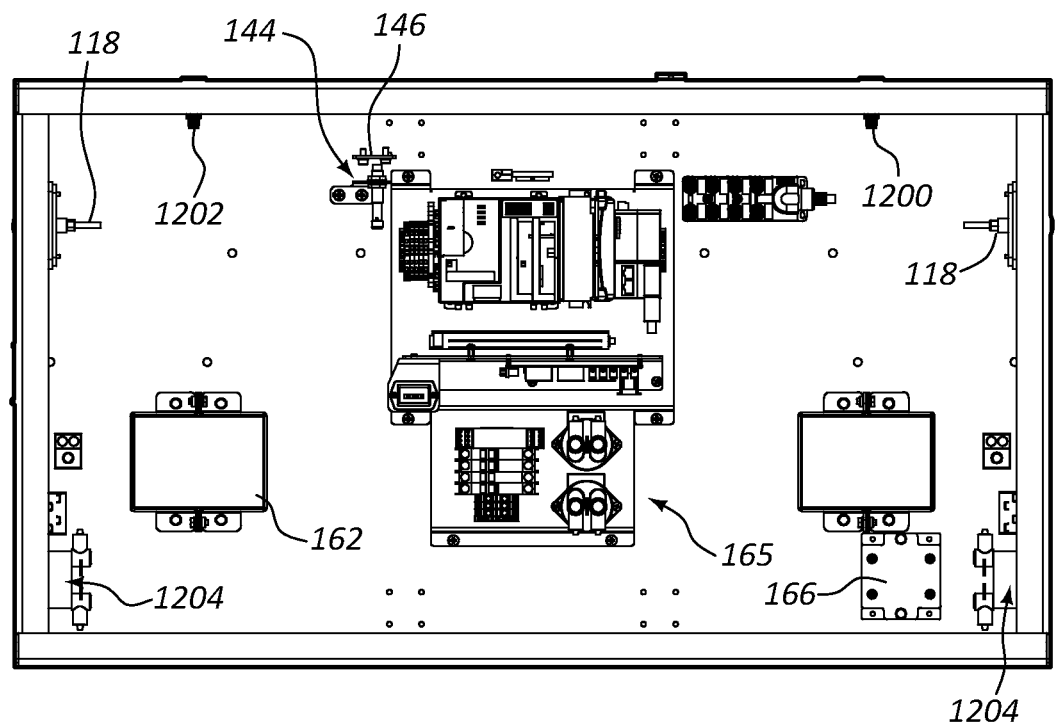
FIG. 12B is a top view of the lifting cart of FIG. 12A.

FIGS. 12A and 12B show simplified views of the lifting cart 100 where electronic components are isolated in the base enclosure 104, including the battery enclosures 162, the pair of proximity sensors 144, the control electronics 165, the contactor assembly 166, the transceiver antennae 118, the lateral photo sensors 1200, 1202, and the external controls 1204. In FIG. 12A, the near sidewall of the base enclosure 104 is hidden to show the detail of components behind it. The lateral photo sensors 1200, 1202 may obtain images or sense light to the side of the lifting cart 100, such as, for example, while positioning the cart 100 in a railway. The lateral photo sensors 1200, 1202 may also be used to detect a home position for the cart 100. For example, in embodiments where the home position of a row cart is on top of an aisle cart, the lateral photo sensors 1200, 1202 may sense two reflectors on the aisle cart and the home position may be established when both reflectors are aligned with the lateral photo sensors 1200, 1202. In other embodiments, reflectors may indicate a home position on a surface of the railway or adjacent to a load.

FIGS. 12A and 12B also show the opposite external orientation of the transceiver antennae 118. The external controls 1204 may be positioned to be accessible from the outside of the base enclosure 104 as shown to allow easier maintenance of the electrical systems of the lifting cart 100. In some embodiments, the external controls 1204 may include a circuit breaker 1206 and lid controls 1208. The circuit breakers 1206 may provide maintenance of the electrical systems, such as, for example, when a fuse is blown. The lid controls 1208 may allow manual control of the position of the lid 102, such as through manipulation of a button or other control interface.

Figure 13:
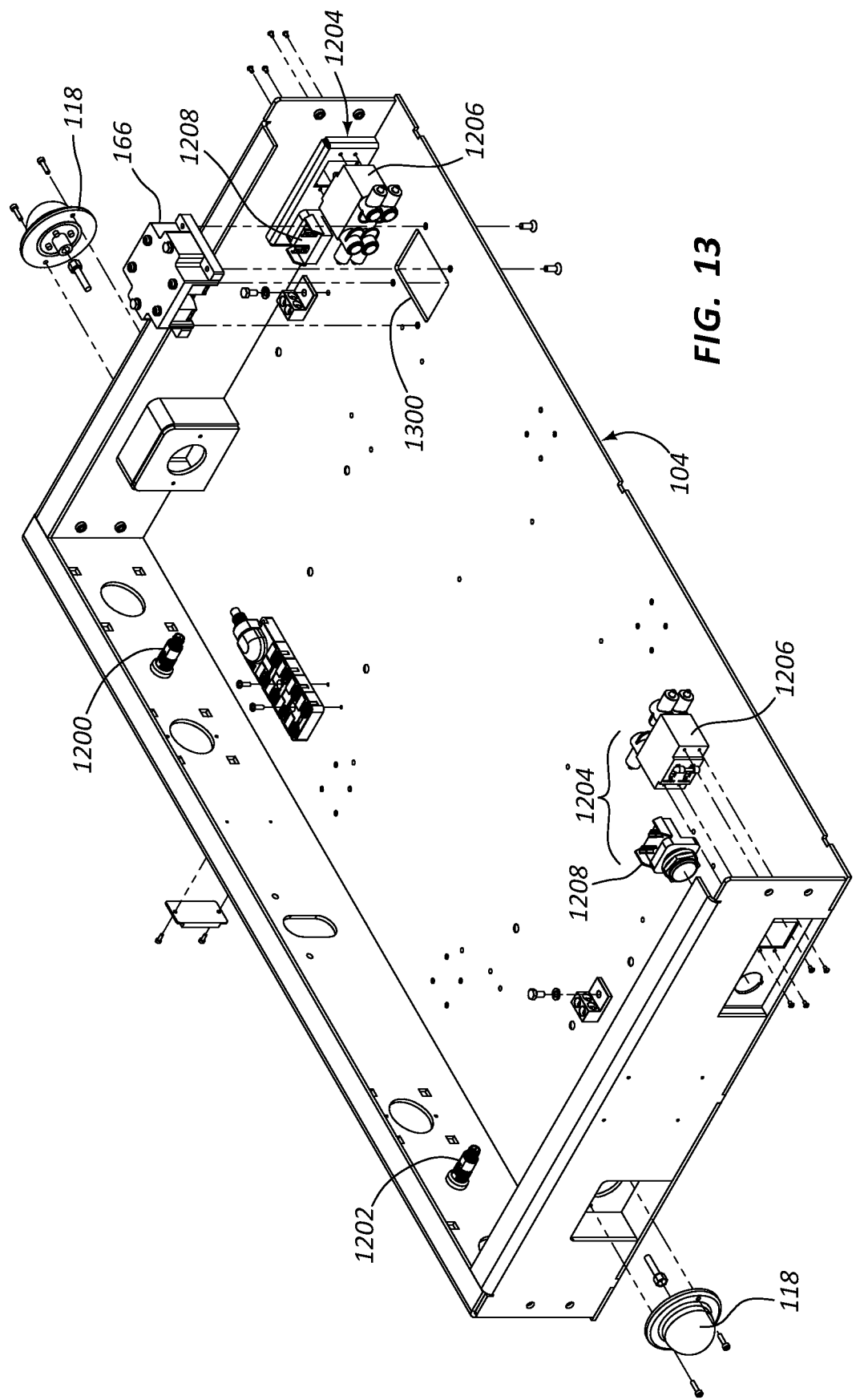
FIG. 13 is a simplified exploded orthographic view of peripheral components of an exemplary embodiment of a lifting cart of the present disclosure.
Figure 14A:
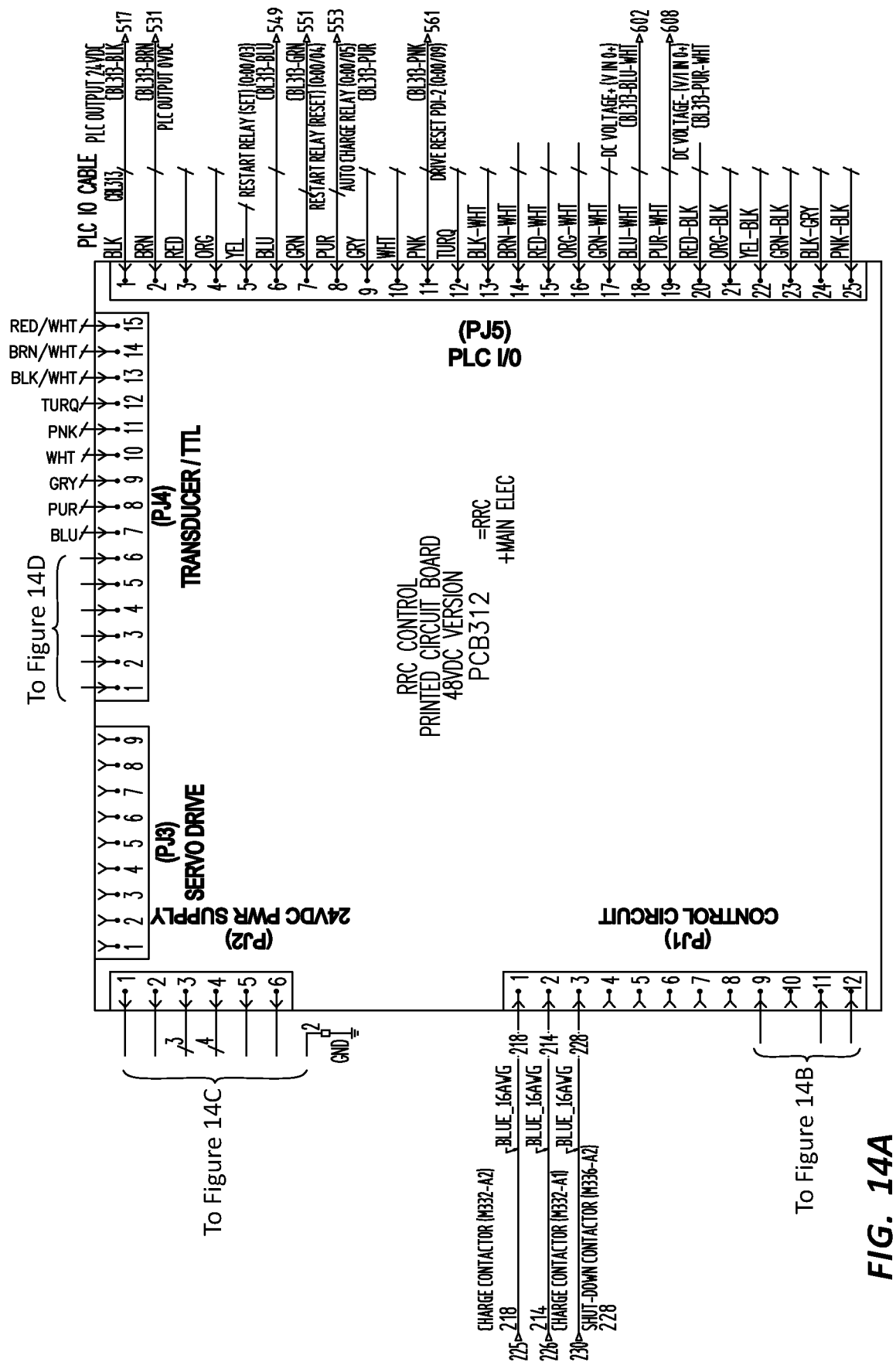
FIG. 14 is an electrical diagram of various electrical components of an exemplary embodiment of a lifting cart of the present disclosure, with FIG. 14A, FIG. 14B, FIG. 14C, and FIG. 14D as enlarged and connecting portions of the same diagram.
Figure 14B:
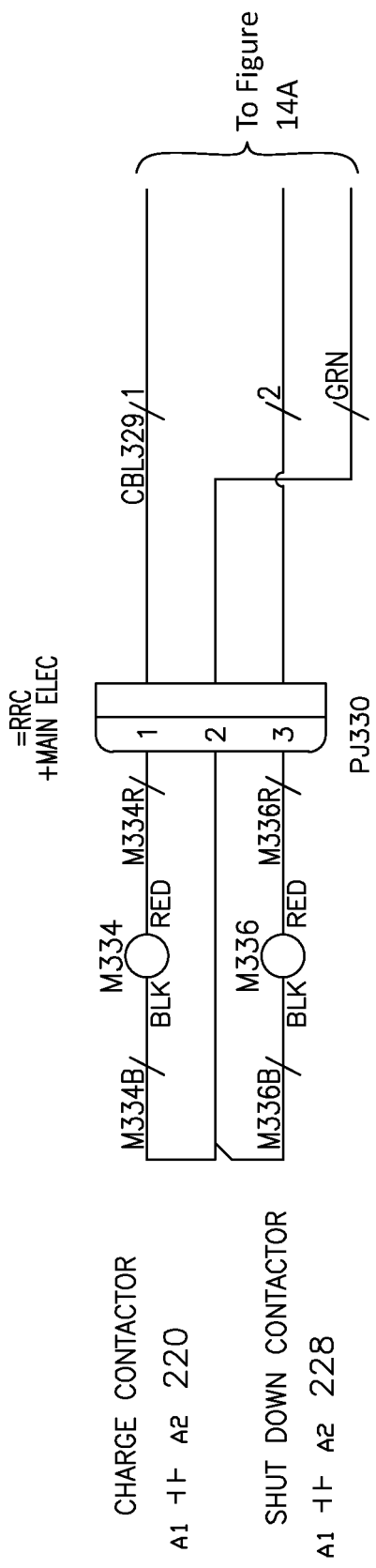
Figure 14C:
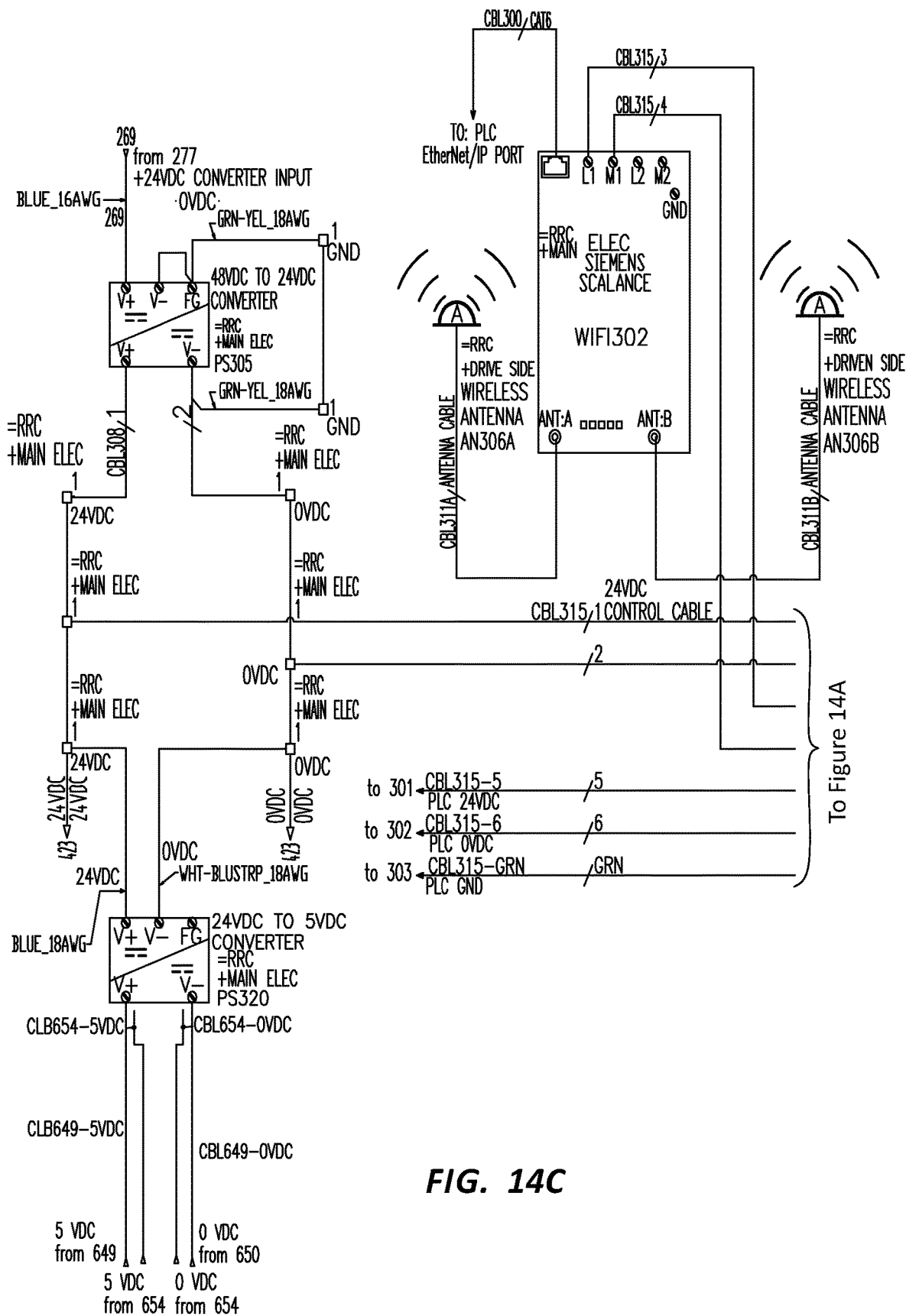
Figure 14D:
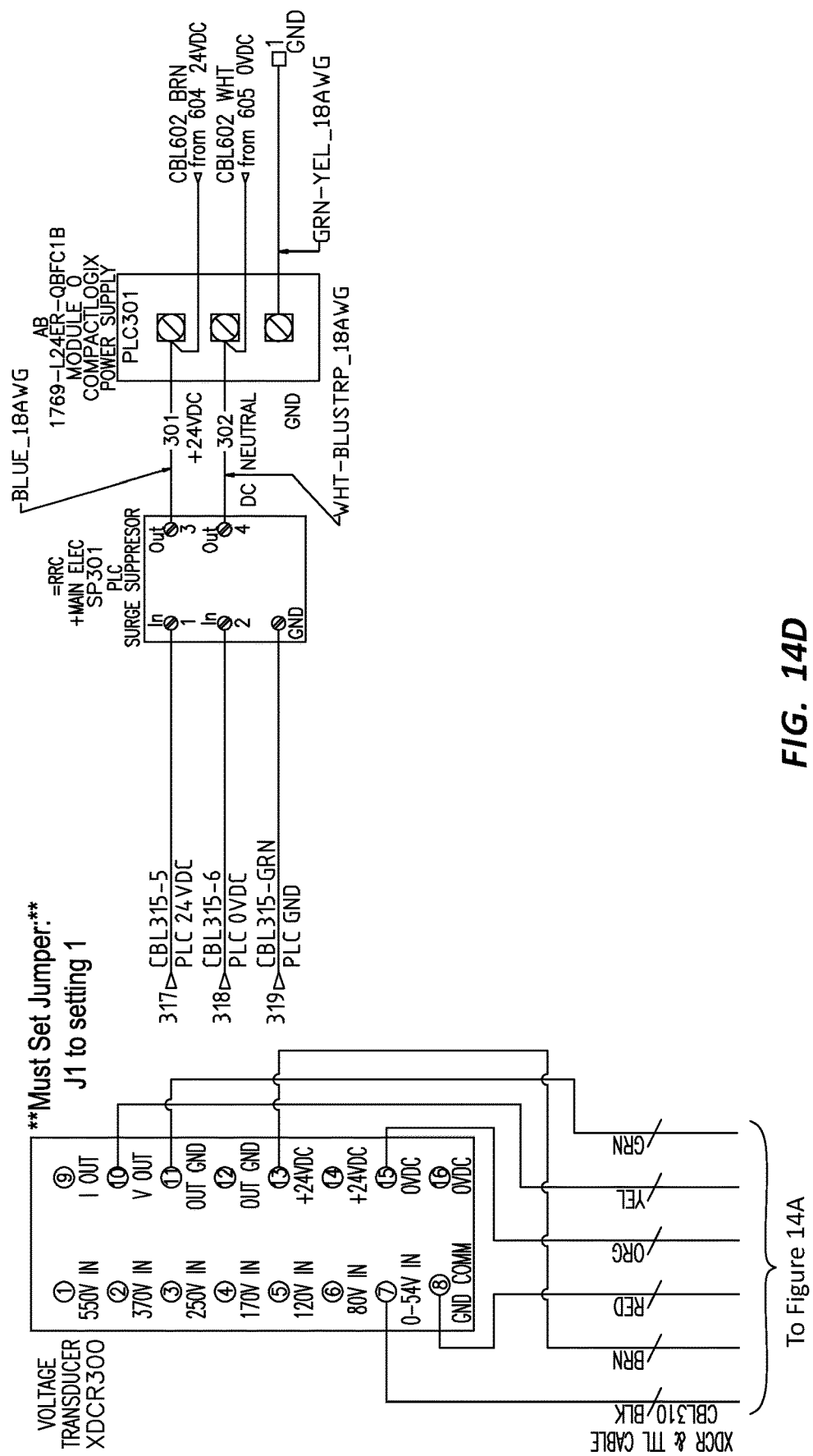

FIG. 13 is a simplified, exploded orthographic view of the cart 100 showing peripheral components around the base enclosure 104. This view shows the individual parts of the external controls 1204 separated from each other. The contactor assembly 166 is also shown in relation to an opening 1300 through which the lower portion of the contactor assembly 166 extends to make contact with pads or leads for a charger. The charger may be on an aisle cart or another home location for the cart 100.

FIG. 14 is an electrical diagram of various components of the lifting cart 100 used in implementation of the control electronics 165 shown in at least FIG. 1G, with FIGS. 14A-14D as enlarged and connecting portions of the same diagram. In the exemplary embodiment shown, control of the lifting cart 100 is provided by a central printed circuit board to which various components are connected, such as, for example, the transceivers 118, sensors (e.g., internal encoder 164, pair of proximity sensors 144, photo sensor 140, lid proximity sensor 1100), and control/CAN signal lines to the motors 152, 153, 156, 158.

FIG. 15 is a close-up exploded view of an exemplary embodiment of a brush assembly 114, such as those shown in FIGS. 1A-1G. The brush assembly 114 may comprise a brush strip assembly 1500 and a support plate 1502. In some embodiments, the brush strip assembly 1500 may be an anti-static brush assembly configured to dissipate static electricity and clear debris from the railway as the cart 100 moves. In some embodiments, the brush strip assembly 1500 may comprise an electrical connection to the brush strip assembly 1500 to capacitors or another energy storage medium configured to collect the static energy dissipated from the railway by the brushes.

Figure 16:
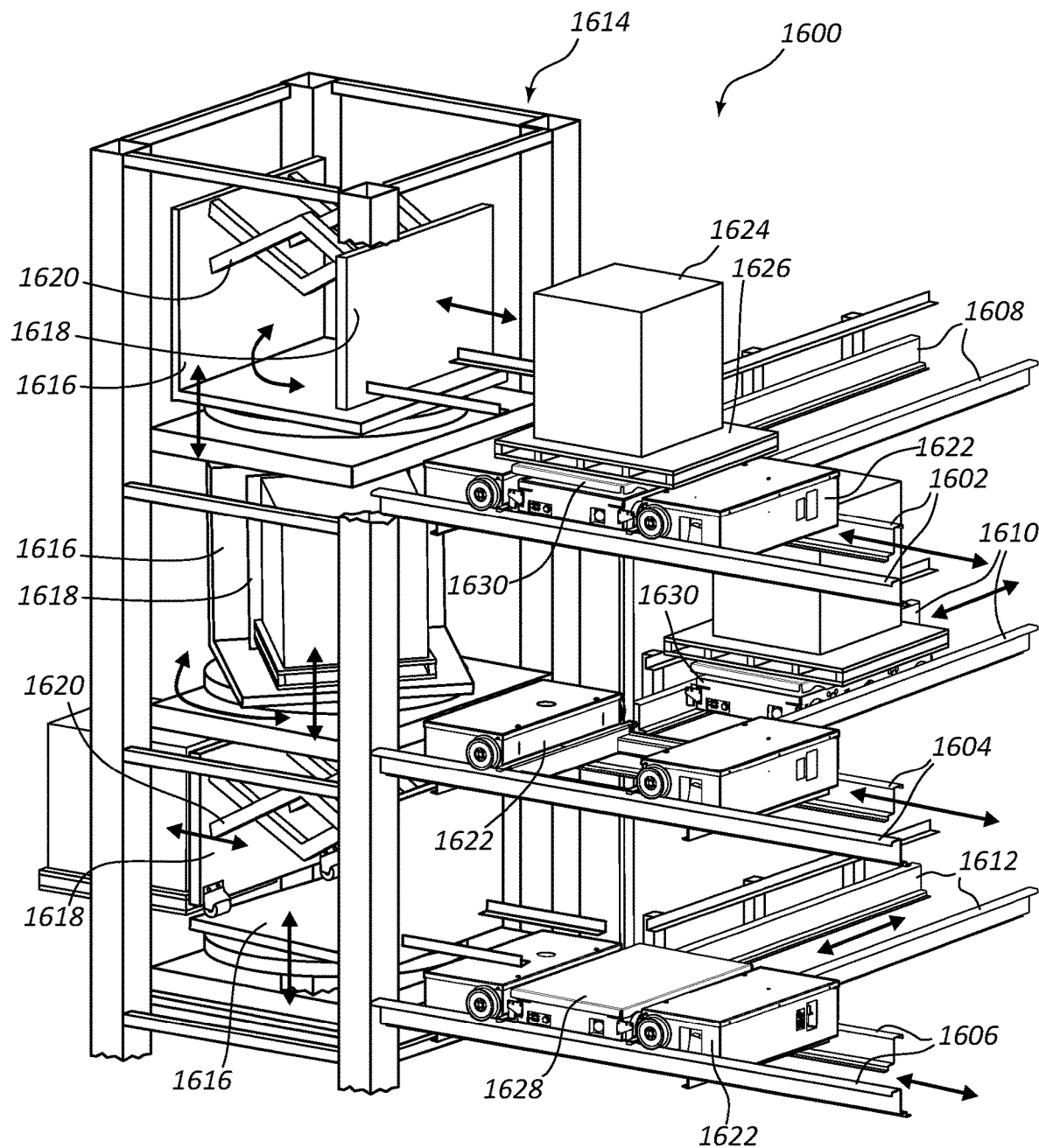
FIG. 16 is an illustration of an automated storage and retrieval system (AS/RS) according to an example implementation of various elements of the present disclosure.

FIG. 16 is an illustration of an automated storage and retrieval system (AS/RS) 1600 according to an example implementation of various elements of the present disclosure. An AS/RS system 1600 may include a network of multi-level aisle railways 1602, 1604, 1606 connected to multi-level row railways 1608, 1610, 1612. The row railways 1608, 1610, 1612 may be substantially perpendicular to the aisle railways 1602, 1604, 1606. The levels may be linked to each other using an elevator 1614 which may have a rotating freight platform 1616. The rotating freight platform 1616 may be loaded by a forklift or forklift-like apparatus (FLA) 1618. In FIG. 16, the rotating freight platform 1616 is shown in multiple positions illustrating an exemplary path of motion from bottom to top of the railway structure. The rotating freight platform may be unloaded through use of a scissor-jack 1620. Aisle carts 1622 may be positioned to retrieve a load 1624 on a pallet 1626 moved by the elevator 1614. The aisle carts 1622 may move along the aisle railways 1602, 1604, 1606 while carrying a row cart (e.g., an unloaded row cart 1628 or loaded row cart 1630). An unloaded row cart 1628 may be positioned underneath a pallet 1626 and then raise its lid (e.g., lid 102) to engage and lift the pallet 1626, such as is shown by each loaded row cart 1630. The aisle cart 1622 may then move the loaded row cart 1630 to a railway (e.g., railways 1608, 1610). The loaded row cart 1630 may then separately move along the railway 1608 to deposit the pallet 1626 at a designated location. The row cart may then return unloaded to a home position on the aisle cart 1622 for recharging or for service in moving and storing another pallet.

In some embodiments, the cart 100 may be controlled in a railway. The cart 100 may include positioning apparatus, at least one motor, and a control module. The positioning apparatus and at least one motor may be as described in previous embodiments. The control module may provide the cart with independent control, monitoring, and positioning capability. In these embodiments, the control module may also receive commands, instructions, updates, and other directional elements via a network connection to a server. The network between the cart and the server may include a wired or wireless network, such as, for example, a local area network (LAN) or wide area network (WAN) including, without limitation, the Internet or an intranet. Connectivity over the network may be achieved by a variety of wired and wireless connectivity devices, including, for example, wi-fi, radio frequency (RF) communications, Bluetooth®, Zigbee®, cables, tethers, wireless Ethernet, cellular network communications, Wireless LAN, other formats known in the art, and combinations thereof.

In other embodiments, the control module on the cart may simply receive and execute commands and instructions directly from the server without capability for independent calculation and control. Some of these arrangements may be referred to as a master-slave configuration where a control module of the server is the master and control module of the cart is the slave. The server may be a remote controller, computing module, or computer configured to monitor the cart and locate and position the cart, via the server control module, through remote control and communication of the positioning apparatus, motor, and/or control module. The control module of the server may be similar to the control module of the cart and may additionally be configured to receive information from multiple carts, monitor their positions and other status information (e.g., whether they are loaded or unloaded), and issue commands and instructions as needed according to input from a user or a preprogrammed or preconfigured routine. In some embodiments, the server may be connected through the network to a plurality of carts in various railways (or in the same railway) to monitor the positioning and location of the plurality of carts. In some embodiments, this may be beneficial in avoiding collisions between the carts, the loads they may carry, and the railway structures themselves.

In configurations where a cart connects to a server, the cart (or control module on the cart) may further comprise wired or wireless connectivity apparatus configured to make connection with the server over shared network protocols.

In some embodiments, a control module (e.g., the control module of the cart or of the server) may include a communications module, a conversion module, and a positioning module. In some embodiments, the control module may also include a lift control module configured to control the motion of the lid (e.g., lid 102) or other load-bearing surface of a lifting cart.

Figure 17:
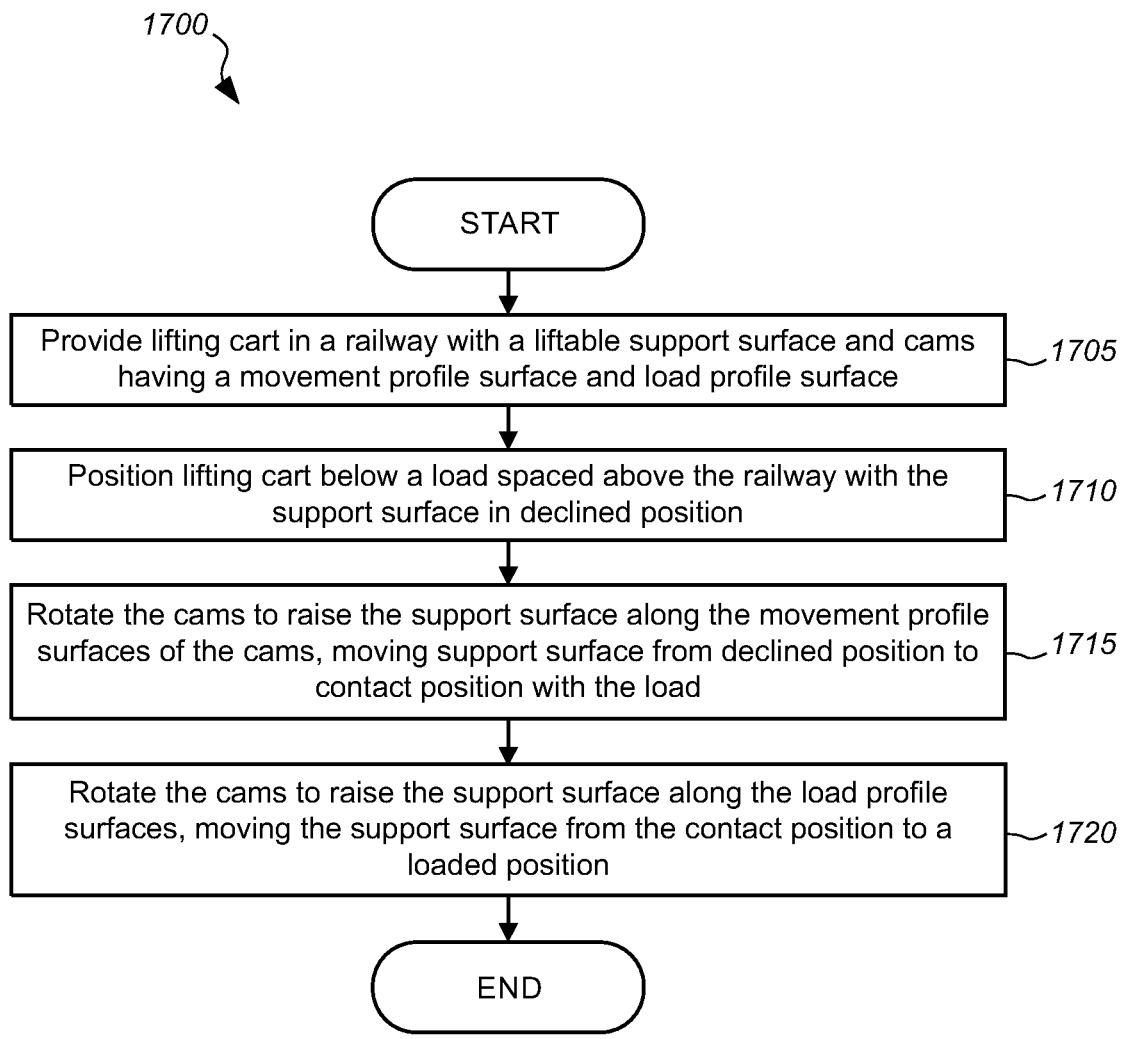
FIG. 17 is a flow diagram of an exemplary process by which a load may be lifted by an automated lifting cart.

FIG. 17 is a flow diagram illustrating a process 1700 by which a load may be lifted by an automated lifting cart (e.g., lifting cart 100). First, in block 1705, the lifting cart may be provided in a railway. The lifting cart may have a liftable lifting surface (e.g., lid 102 and/or support surfaces 124) and cams that have a movement profile surface and a load profile surface (e.g., cams 130, 132, 134, 136).

In block 1710, the lifting cart is positioned below a load that is spaced above the railway. In this position, the lifting surface of the lifting cart is in its declined position. The cart may be positioned in the railway by moving itself down the railway (e.g., via the drive wheels 110, drive motors 152, 153, 154, 156 and drive shafts 148, 150) or by being moved by an aisle cart or other means in the system (e.g., the AS/RS system 1600). The load may be spaced above the cart in this position, meaning there is clearance between the underside of the load and the top side of the cart. The load may be resting on the railway or suspended by some other structure above the cart in the railway. The position of the cart below the load may be established by a sensor on the lifting cart. For example, the controller of the cart may use photo sensor 140 to detect the load through the lid 102 of the cart (e.g., through port 120 or by an electromagnetic sensor that can penetrate the lid 102). The controller may alternatively determine the positioning of the cart using the internal encoder 164 or photo sensor 140 and compare that position to a known position of the load, and the cart can be controlled so that its position corresponds with being underneath the load.

The lifting surface of the cart may be in its declined position in block 1710. In some configurations, this means it may be at or near its lowest possible position relative to the rest of the cart. In other configurations, this may refer to a point where the lifting surface is just low enough to have clearance beneath any load encountered in the railways in which it moves. In any of these configurations, the declined position may allow the cart to move beneath the load without colliding with the load.

In block 1715, the cart is in position and the plurality of cams within the cart raise the lifting surface vertically along their movement profile surfaces. This action may raise the lifting surface from the declined position to at least a point where the lifting surface is in contact with the load. In some embodiments, the cams may drive the lifting surface to lift the load beyond the point of contact as well. This may be beneficial when the load is not heavy enough to damage the cam motors driving the cams during the lift or there is sagging of the load that makes the underside of the load closer to the lifting surface than is expected. In some embodiments, as the lifting surface is raised, the cart remains in place, and in some embodiments, the cart may be moving as the lifting surface is raised, such as when the lifting surface is lifted in anticipation of the cart reaching the lifting position below the load. By allowing the cart to raise the lifting surface before coming to a complete stop, the cart may in some cases work more quickly in moving the load.

In block 1720, the cart continues to rotate the cams and lifts the lifting surface (and the load) from at least the point of contact to the loaded position relative to the lifting cart. The loaded position in this block 1720 may refer to a position where the load is at its maximum distance above the railway on which the cart is traveling or that maximum distance that the cams can raise the lifting surface. In some embodiments, the loaded position may be any position where the load is no longer resting on the railway (or being suspended by some other support structure) and can be moved by the cart parallel to the railway. After the completion of block 1720, the load may be moved by the cart.

In blocks 1715 and 1720, the load profile surfaces of the cams may have characteristics that raise the lifting surface at a lower rate of lift per degree of rotation of the plurality of cams than the movement profile surfaces. In other words, the movement profile surfaces may raise the lifting surface at a faster rate per degree of rotation than the load profile surfaces. In this manner, the unloaded portion of the lift can take place quickly, yet the cam motors are not required to have a torque output great enough to lift the load at the same speed as the movement profile surfaces would require, as discussed in further detail in connection with FIGS. 8A-8E.

In some embodiments, the process 1700 may additionally comprise providing a first cam shaft in the cart that is connected to a first pair of the plurality of cams and a second cam shaft that is connected to a second pair of the plurality of cams. In this configuration, the controller may read a rotation property of the first cam shaft (e.g., angular position, angular velocity, or angular acceleration) and drive the rotation of the second cam shaft based on the rotation property of the first cam shaft. For example, the controller may use an encoder or sensor (e.g., cam sensor 900) to detect the rotation property of the first cam shaft and then control the second cam shaft to match that rotation property (e.g., cause it to have the same angular position, velocity, or acceleration). In some embodiments, the controller may monitor the second cam shaft, such as, for example, by using an encoder or sensor to track whether the second cam shaft follows the rotation property measured from the first cam shaft. In an exemplary embodiment, the rotation property read by the controller may be the home position of the first cam shaft. The second cam shaft is then controlled to move to its home position, as may be confirmed by a cam sensor or encoder on the second cam shaft.

In some embodiments, the process 1700 may additionally comprise a step of repositioning the lifting cart and the load being lifted by the cart in the loaded position to a destination position. For example, the cart and load may be driven by drive wheels of the cart from the position where the cart first came into contact with the load to another position, such as on the aisle cart or in a different position along the same row. In another example, the cart and load may be repositioned by the aisle cart configured to carry the row cart and load simultaneously. Upon repositioning the load to a destination position (e.g., at the point where the load is to be deposited), the controller may rotate the plurality of cams to lower the lifting surface from the loaded position to the declined position where the load is supported or suspended above the cart again. In some embodiments, the rotation of the cams may be a continuation of the rotation of the cams in blocks 1715 and 1720, such as by continuing a clockwise rotation of the cams which had been rotating clockwise in blocks 1715 and 1720 to reach a 360-degree rotation overall. In other embodiments, the rotation of the cams may be a reversal of the rotation performed in blocks 1715 and 1720 where the cams are rotated backwards from the loaded position, such as by reversing a clockwise rotation of the cams performed in blocks 1715 and 1720.

Figure 18:
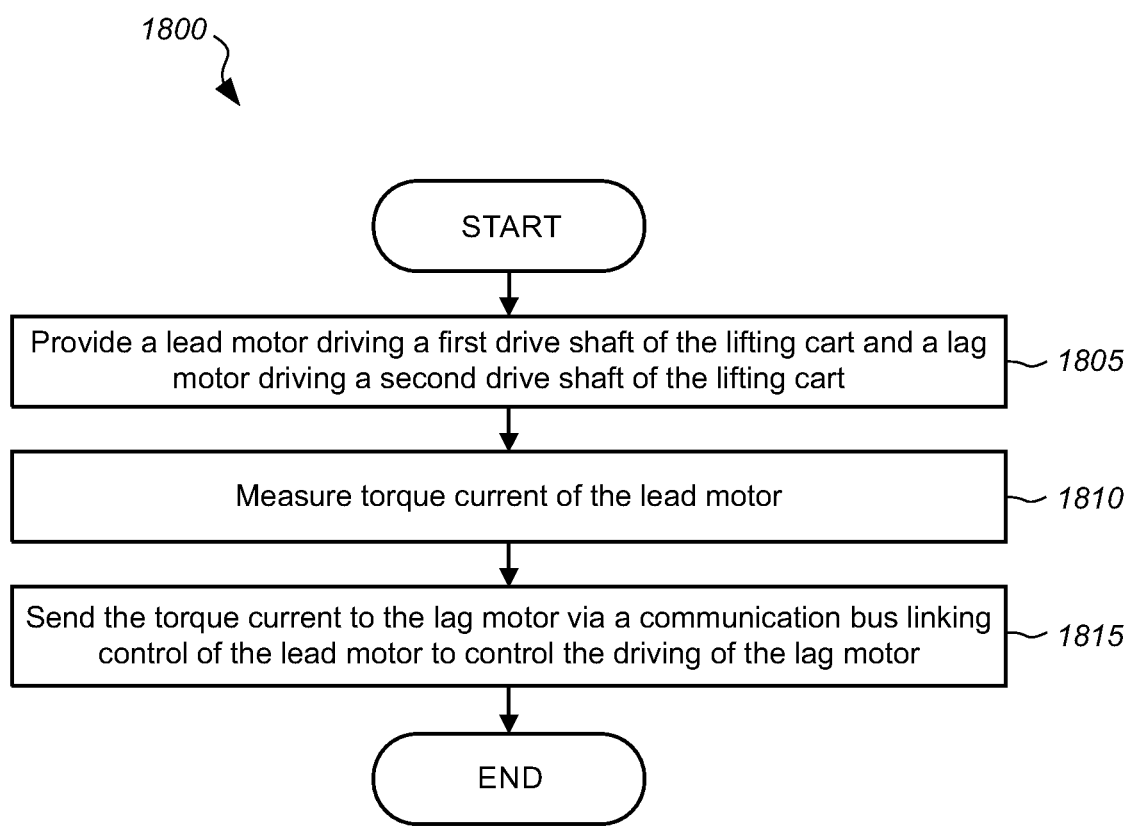
FIG. 18 is a flow diagram of an exemplary process by which drive shafts in an automated lifting cart may be synchronized in rotation and/or position.

FIG. 18 is a flow diagram illustrating a process 1800 by which drive shafts in an automated lifting cart may be synchronized in rotation and/or position. In block 1805, a lifting cart is provided in which a lead motor drives a first drive shaft of the cart and a lag motor drives a second drive shaft of the cart. For example, the cart may be cart 100, the lead motor may be drive motor 152, the lag motor may be drive motor 153, and the drive shafts may be front and rear drive shafts 148, 150. The drive shafts may be connected to drive wheels (e.g., drive wheels 110) configured to provide movement to the cart. In block 1810, the controller measures the torque current of the lead motor. The torque current may correspond to the rate of motion of the motor output or rotation of the drive shaft which the lead motor is driving.

In block 1815, the torque current is sent to the lag motor via a communication bus linking control of the lead motor to control of the driving of the lag motor. In this manner, the lag motor may be driven such that its output provides the same rate of rotation to the second cam shaft that the lead motor provides to the first cam shaft. The torque current may in some cases not be sent directly to the lag motor since the lag motor may not produce the same output as the lead motor in response to the same torque current. In some embodiments, however, such as where the lead motor and the lag motor are the same model of motor or have the same response to the same torque current, the lag motor is directly driven by the controller to match the torque current. In block 1815, the communication bus may be bus 1905 described in connection with FIG. 19.

In some embodiments, the lead motor and lag motor are connected to drive shafts that act as cam shafts, such as, for example, cam shafts 154, 156 connected to cam motors 158, 160. Thus, when the first drive shaft or second drive shaft in block 1805 are rotated, cams connected to the drive shafts are also rotated.

Figure 19:
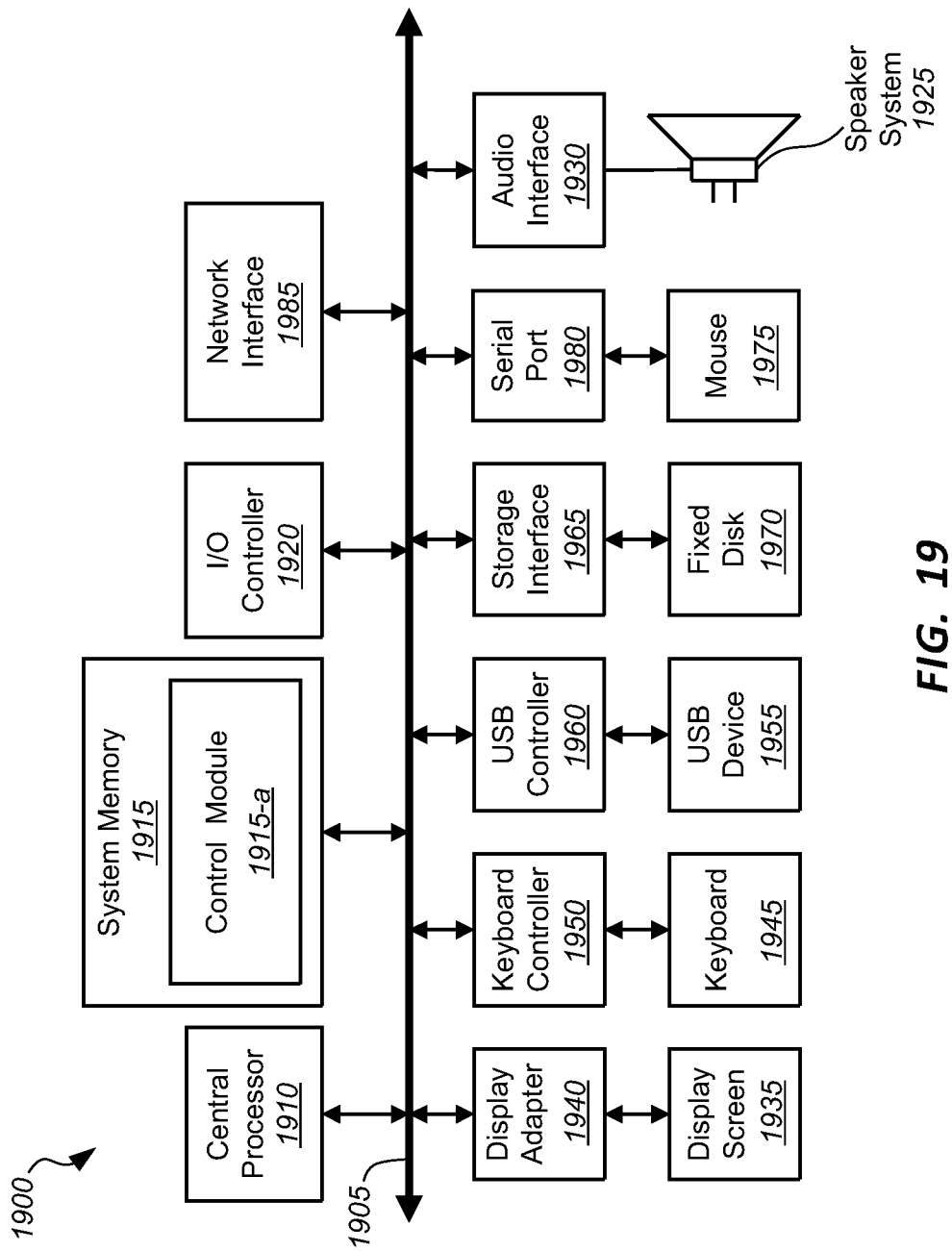
FIG. 19 is a block diagram of a computer system suitable for implementing some embodiments of the present disclosure.

FIG. 19 depicts a block diagram of a computer system 1900 suitable for implementing some embodiments of the present systems and methods. For example, the computer system 1900 may be suitable for implementing the control modules described herein as being on the cart or on a server, the control electronics 165 of FIG. 1G, or the circuit of FIG. 14 (FIGS. 14A-14D). Computer system 1900 includes a bus 1905 which interconnects major subsystems of computer system 1900, such as a central processor 1910, a system memory 1915 (typically RAM, but which may also include ROM, flash RAM, or the like), an input/output controller 1920, an external audio device, such as a speaker system 1925 via an audio output interface 1930, an external device, such as a display screen 1935 via a display adapter 1940, a keyboard 1945 (interfaces with a keyboard controller 1950) (or other input device), multiple universal serial bus (USB) devices 1955 (interfaces with a USB controller 1960), and a storage interface 1965. Also included are a mouse 1975 (or other point-and-click device) interfaced through a serial port 1980 and a network interface 1985 (coupled directly to bus 1905).

Bus 1905 allows data communication between central processor 1910 and system memory 1915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a control module 1915-*a* to implement the present systems and methods may be stored within the system memory 1915. The control module 1915-*a* may be one example of the control modules described in connection with FIGS. 17-18 and part of various computing modules or controllers discussed herein. Applications resident with computer system 1900 are generally stored on and accessed via a non-transitory computer readable medium, such as a hard disk drive (e.g., fixed disk 1970) or other storage medium. Additionally, applications can be in the form of electronic signals modulated in accordance with the application and data communication technology when accessed via interface 1985.

Storage interface 1965, as with the other storage interfaces of computer system 1900, can connect to a standard computer readable medium for storage and/or retrieval of information, such as a fixed disk drive 1970. Fixed disk drive 1970 may be a part of computer system 1900 or may be separate and accessed through other interface systems. Network interface 1985 may provide a direct connection to a remote server (e.g., the server described above) via a direct network link to the Internet via a POP (point of presence). Network interface 1985 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 19 need not be present to practice the present systems and methods. The devices and subsystems can be interconnected in different ways from that shown in FIG. 19. The operation of a computer system such as that shown in FIG. 19 is readily known in the art and is not discussed in detail in this application. Code to implement the present disclosure can be stored in a non-transitory computer-readable medium such as one or more of system memory 1915 or fixed disk 1970. The operating system provided on computer system 1900 may be iOS®, MS-DOS®, MS-WINDOWS®, OS/2®, UNIX®, Linux®, MAC OS X®, or another like operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein (e.g., in connection with FIGS. 17-18) are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon." Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. An apparatus for lifting a load on an automated lifting cart, the apparatus comprising:
    a lifting surface connected to the lifting cart and vertically movable relative to the lifting cart;
    a first and a second pair of cams, each pair of cams positioned underneath the lifting surface and having cam profiles shaped to lift the lifting surface upon rotation of each pair of cams;
    a first encoder operable to read a rotation property of the first pair of cams, and a second encoder operable to read a rotation property of the second pair of cams;
    a controller configured to control rotational movement of each of the first and second pairs of cams, the controller synchronizing the rotation properties of the first and second pairs of cams by matching output from the first and second encoders,
    wherein:
        the lifting surface comprises a lid and a support frame, the support frame being below the lid and attached to the lid by a hinge;
        the first and second pairs of cams are positioned underneath the support frame and lift the support frame along with the lid upon rotation of the first and second pairs of cams; and
        rotating the lid about the hinge provides access to an area of the lifting cart underneath the lid.

2. The apparatus of claim 1, wherein the cam profiles of the first pair of cams are reversed in orientation in relation to the cam profiles of the second pair of cams.

3. The apparatus of claim 2, wherein the first pair of cams is configured to rotate in an opposing direction from the second pair of cams.

4. The apparatus of claim 1, further comprising a plurality of cam followers extending below the lifting surface to contact the first and second pairs of cams.

5. The apparatus of claim 1, further comprising at least one stabilizer connecting the lifting surface to the lifting cart, the at least one stabilizer isolating movement of the lifting surface to substantially vertical translation.

6. The apparatus of claim 1, wherein the cam profiles are asymmetrically bean-shaped.

7. The apparatus of claim 1, wherein each of the cam profiles comprises a movement profile portion and a load profile portion, the movement profile portion lifting the lifting surface more quickly than the load profile portion upon rotation of the pairs of cams.

8. The apparatus of claim 7, wherein the movement profile portion is positioned in the cam profiles to lift the lifting surface before the load profile portion.

9. The apparatus of claim 7, wherein upon rotation of the first and second pairs of cams, the movement profile portion lifts the lifting surface prior to the lifting surface contacting a load and the load profile portion lifts the lifting surface from about when the lifting surface contacts the load.

10. The apparatus of claim 1, wherein the first and second pair of cams have contact points below the lifting surface, the contact points forming rectangular corner points.

11. The apparatus of claim 1, wherein the rotation properties read by the first and second encoders are angular position vectors.

12. The apparatus of claim 1, further comprising a first and a second motor, the first motor driving rotation of a first cam shaft linked to the first pair of cams, the second motor driving rotation of a second cam shaft linked to the second pair of cams.

13. The apparatus of claim 12, wherein at least the first encoder is integrated with at least the first motor.

14. The apparatus of claim 12, wherein the first and second motors are hollow bore motors.

15. A method of lifting a load of the automated lifting cart of claim 1, the method comprising:
    providing the lifting cart in a railway, cam profiles of the cams of the first pair and the second pair of cams each having a movement profile surface and a load profile surface;
    positioning the lifting cart below a load spaced above the railway with the lifting surface in a declined position;
    rotating the cams of the first pair and the second pair of cams to raise the lifting surface along the movement profile surfaces, thereby moving the lifting surface from the declined position to at least near to a contact position with the load;
    rotating the plurality of cams to raise the lifting surface along the load profile surfaces, thereby moving the lifting surface from the contact position to a loaded position relative to the lifting cart;
    wherein the load profile surfaces raise the lifting surface at a lower rate per degree of rotation of the plurality of cams than the movement profile surfaces.

16. The method of claim 15, wherein positioning the lifting cart below a load further comprises detecting a position of the load above the lifting cart using a sensor on the lifting cart.

17. The method of claim 16, wherein the sensor detects the load through the lifting surface.

18. The method of claim 15, further comprising:
    providing a first cam shaft connected to a first pair of the plurality of cams and a second cam shaft connected to a second pair of the plurality of cams;
    reading a rotation property of the first cam shaft;
    driving rotation of the second cam shaft based on the rotation property of the first cam shaft.

19. The method of claim 18, wherein the rotation property is a home position of the first cam shaft, and the second cam shaft is driven to a corresponding home position.

20. The method of claim 15, further comprising:
    repositioning the lifting cart and the load in the loaded position to a destination position;
    rotating the plurality of cams to lower the lifting surface from the loaded position to the declined position, thereby resting the load at the destination position.

21. An automated lifting cart including the apparatus of claim 1, and further comprising:

a front and a rear pair of wheels;

a first drive motor driving the front pair of wheels, and a second drive motor driving the rear pair of wheels, wherein the first and second drive motors drive movement of the lifting cart;

a first cam shaft operable to rotate the first pair of cams, and a second cam shaft operable to rotate the second pair of cams;

a first cam motor driving the first cam shaft, and a second cam motor driving the second cam shaft.

22. The automated lifting cart of claim 21, further comprising:

an energy storage system on the lifting cart, the energy storage system providing energy to the first and second drive motors and to the first and second cam motors.

23. The automated lifting cart of claim 22, wherein the energy storage system is a lithium-ion battery.

24. The automated lifting cart of claim 21, wherein the drive motors and cam motors are hollow bore motors.

25. The automated lifting cart of claim 21, wherein the first and second drive motors are independently controlled and the first and second cam motors are independently controlled.

26. The apparatus of claim 1 further comprising:

a first cam shaft operable to rotate the first pair of cams, and a second cam shaft operable to rotate the second pair of cams;

a first cam motor driving the first cam shaft, and a second cam motor driving the second cam shaft.

* * * * *